(12) United States Patent
Tetsuka et al.

(10) Patent No.: US 7,757,821 B2
(45) Date of Patent: Jul. 20, 2010

(54) BICYCLE HYDRAULIC BRAKE ACTUATION DEVICE

(75) Inventors: Toshio Tetsuka, Osaka (JP); Osamu Kariyama, Osaka (JP); Shinichi Takizawa, Osaka (JP); Shinya Hirotomi, Osaka (JP)

(73) Assignee: Shimano Inc., Osaka (JP)

( * ) Notice: Subject to any disclaimer, the term of this patent is extended or adjusted under 35 U.S.C. 154(b) by 614 days.

(21) Appl. No.: 11/748,202

(22) Filed: May 14, 2007

(65) Prior Publication Data

US 2007/0284203 A1 Dec. 13, 2007

Related U.S. Application Data

(63) Continuation-in-part of application No. 11/449,683, filed on Jun. 9, 2006, now Pat. No. 7,487,638.

(51) Int. Cl.
*B62L 3/02* (2006.01)
*B60T 7/08* (2006.01)
*G05G 1/04* (2006.01)

(52) U.S. Cl. ............................ 188/26; 188/344; 60/594; 74/525

(58) Field of Classification Search ............... 188/24.22, 188/26, 344; 74/522, 523, 525, 502.2; 60/594
See application file for complete search history.

(56) References Cited

U.S. PATENT DOCUMENTS 4,779,482 A * 10/1988 Kawaguchi ................. 74/523
4,840,082 A * 6/1989 Terashima et al. ............. 74/523
5,678,665 A 10/1997 Debreczeni
6,457,378 B2 * 10/2002 Hatakoshi et al. ............. 74/525
6,491,144 B2 12/2002 Ueda et al.
6,739,133 B2 * 5/2004 Barnett ........................ 60/594
6,804,961 B2 * 10/2004 Lumpkin ..................... 188/26
2003/0121739 A1 * 7/2003 Lumpkin ..................... 188/344
2006/0185360 A1 8/2006 Takizawa et al.

FOREIGN PATENT DOCUMENTS

| EP | 1 160 152 A1 | 12/2001 |
| EP | 1 783 044 A2 | 5/2007 |
| JP | 10-230886 | 9/1998 |
| WO | WO-03/047954 A1 | 6/2003 |

OTHER PUBLICATIONS

The extended European Search Report of corresponding European Application No. 07022612.1, dated Mar. 5, 2010.

* cited by examiner

*Primary Examiner*—Thomas J Williams
(74) *Attorney, Agent, or Firm*—Global IP Counselors, LLP

(57) ABSTRACT

A bicycle hydraulic brake actuation device includes a hydraulic master cylinder housing having a bore, a master piston and a radial seal received in the bore a push rod and a lever. The push rod is configured to move the master piston and the radial seal between a neutral position and a braking position. The lever is pivotally attached to the housing for pivotal movement between an at rest position and a brake actuation position. The lever includes a contact surface configured and arranged to move the push rod as the lever is pivoted between the at rest position and the brake actuation position. Further, the push rod includes at least one roller configured to contact to the contact surface of the lever.

17 Claims, 31 Drawing Sheets

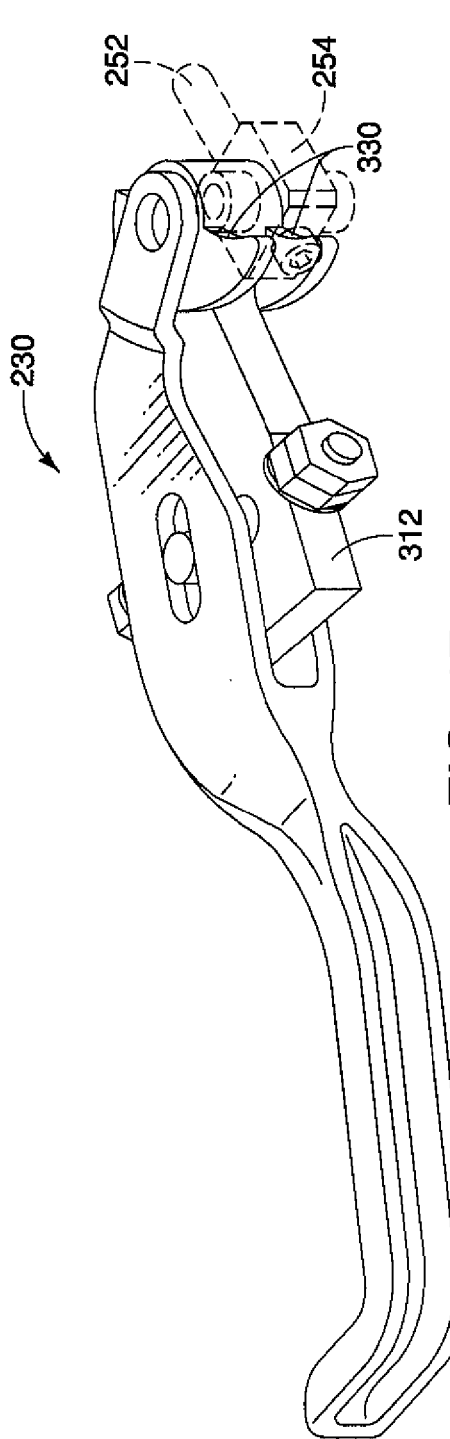
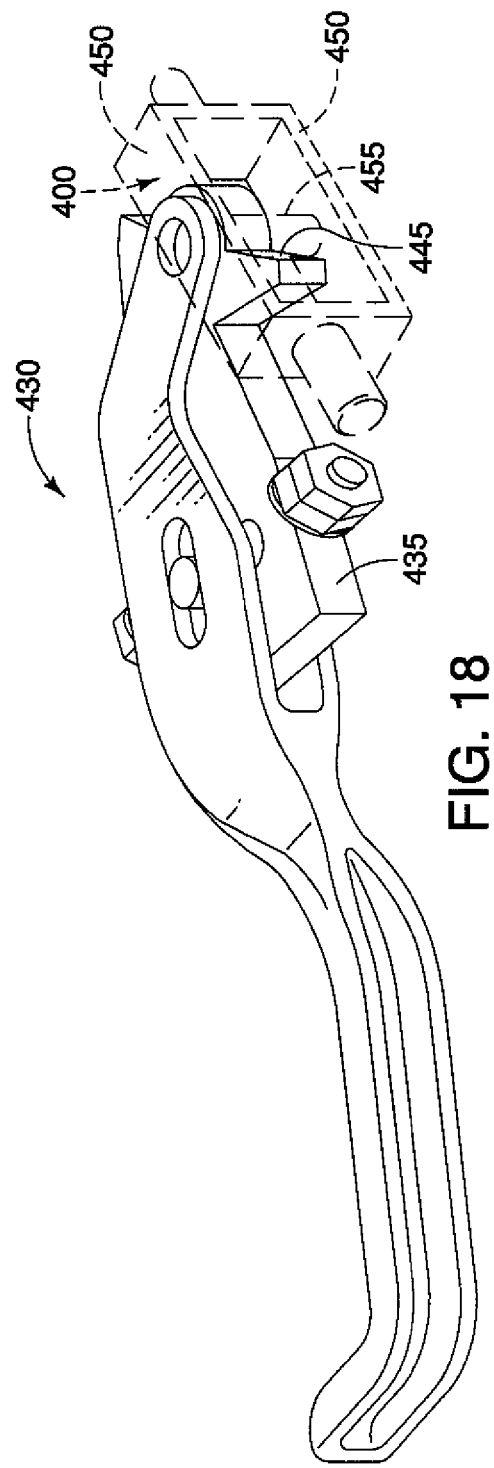

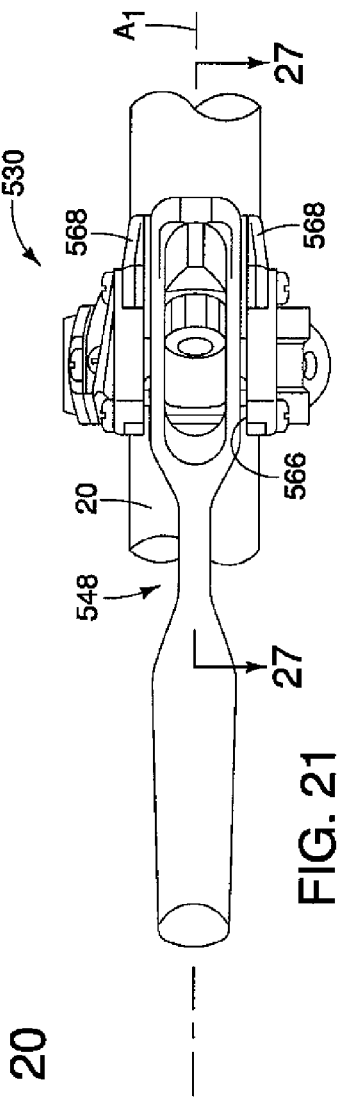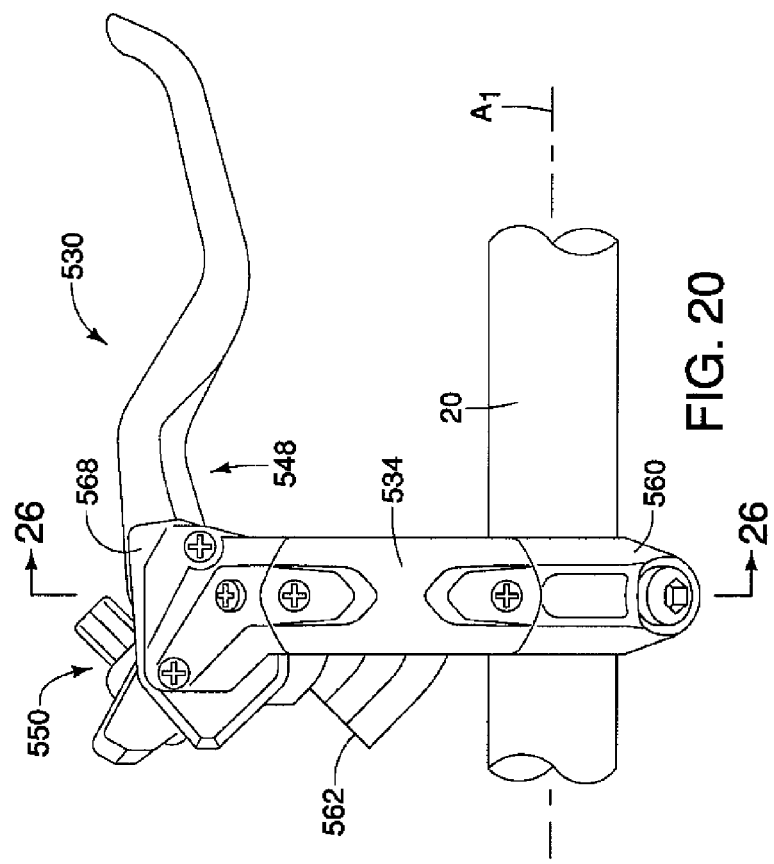

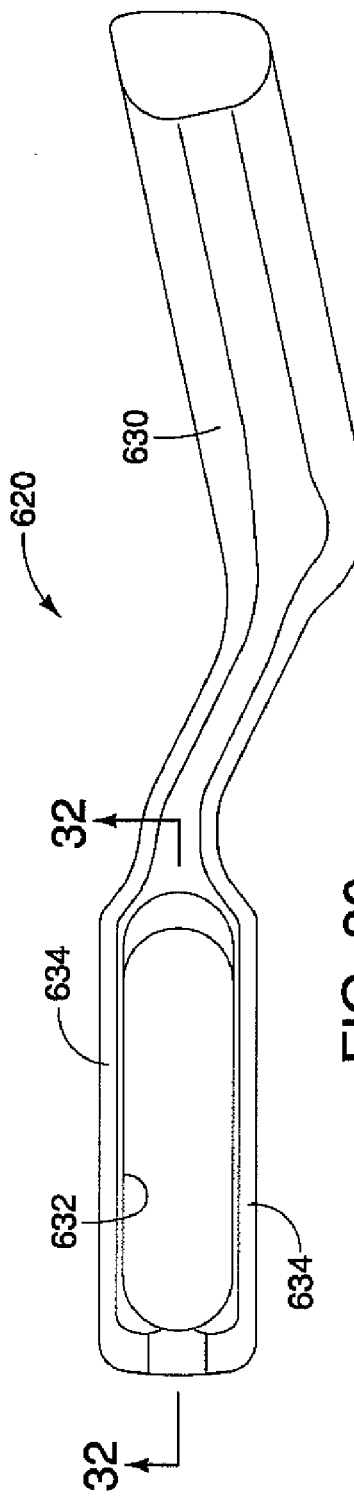
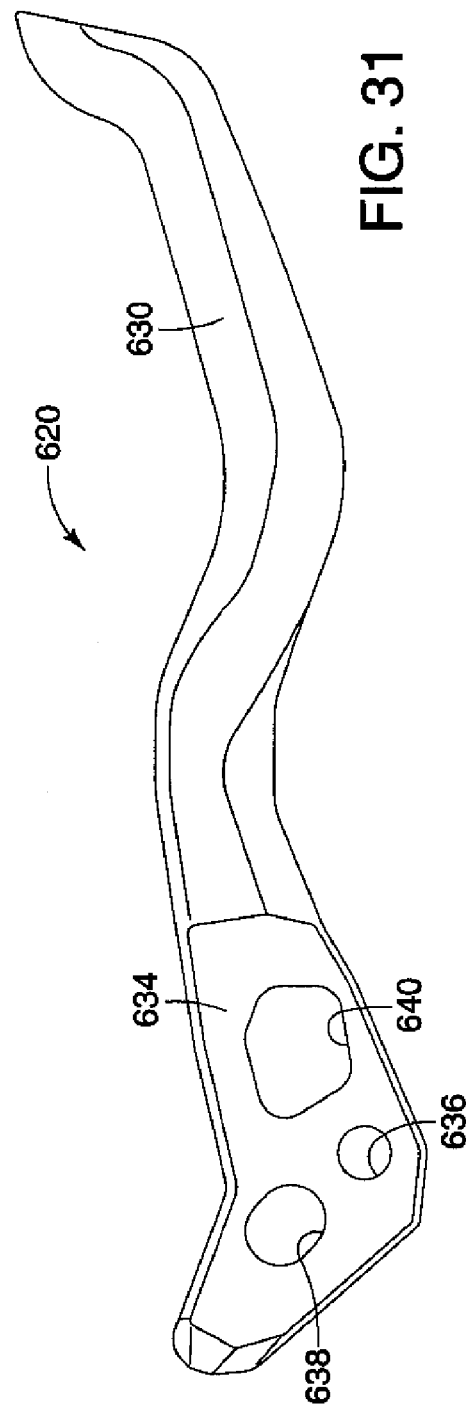

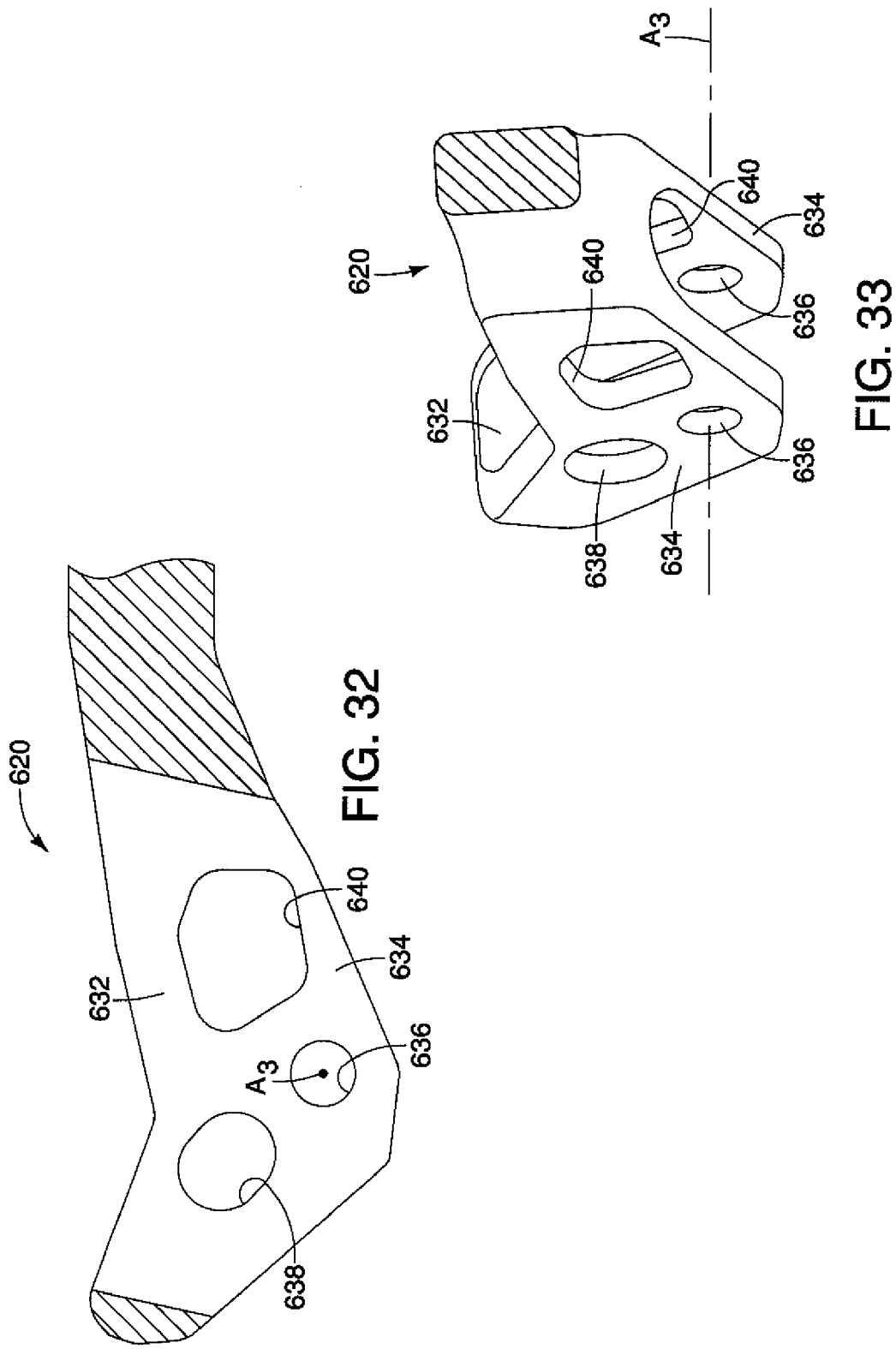

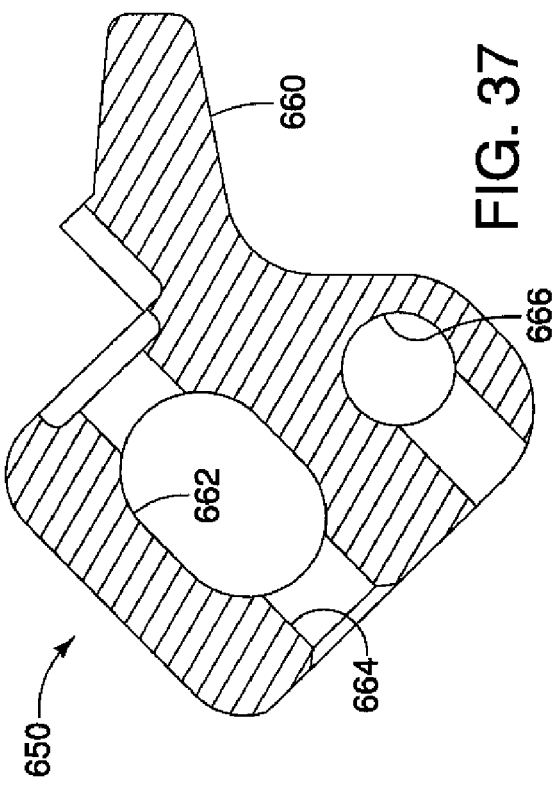
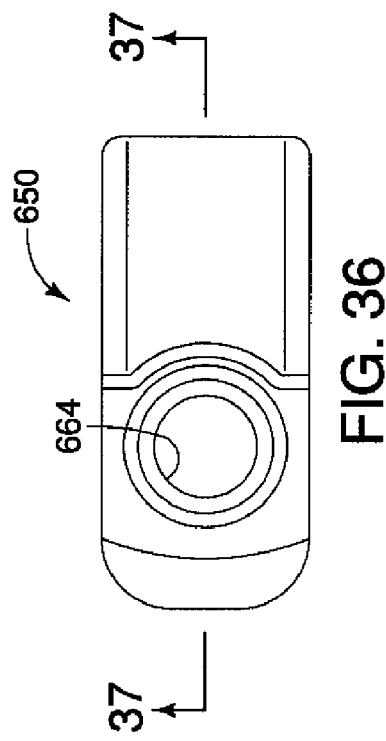
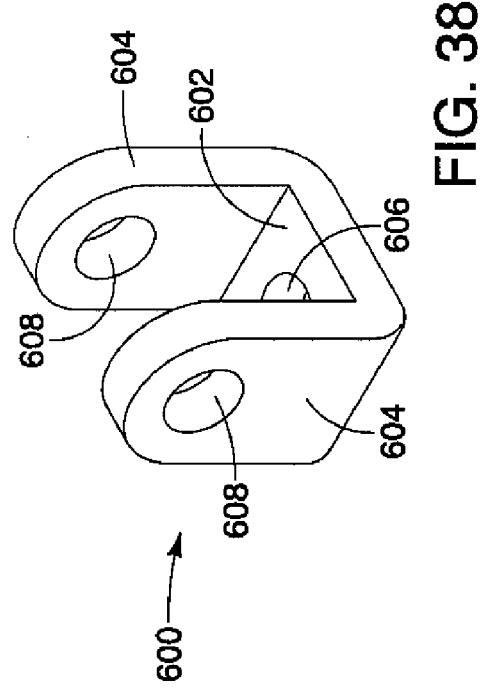

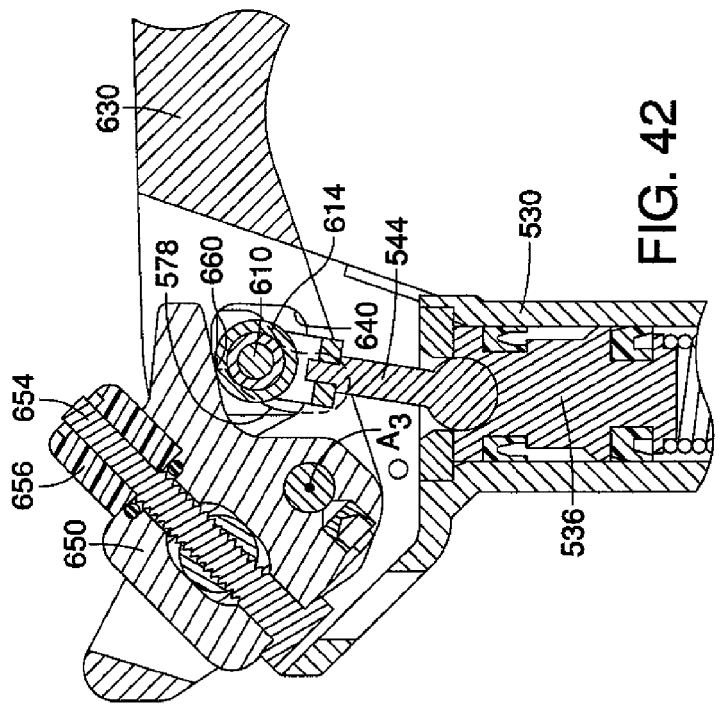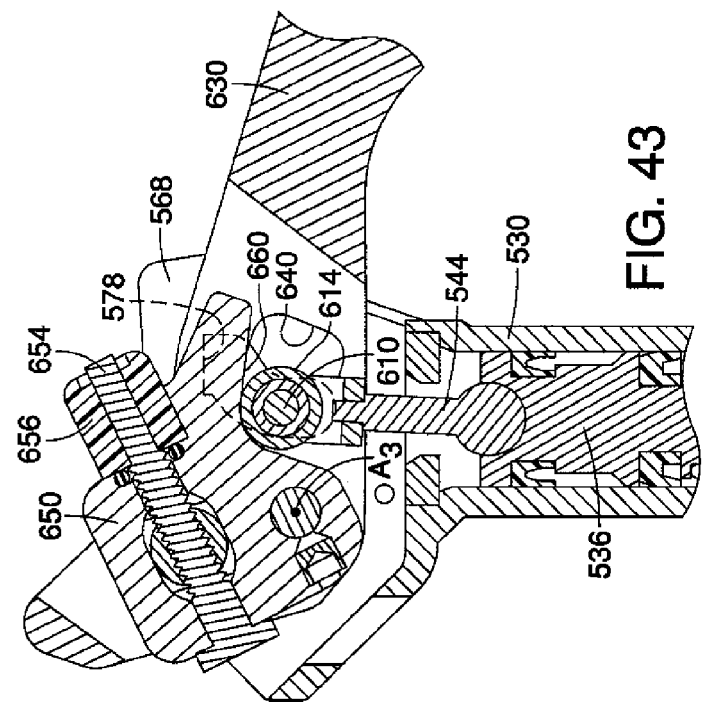

US 7,757,821 B2

BICYCLE HYDRAULIC BRAKE ACTUATION DEVICE

This application is a continuation-in-part application of U.S. patent application Ser. No. 11/449,683 filed on Jun. 9, 2006. The entire disclosure of U.S. patent application Ser. No. 11/449,683 is hereby incorporated herein by reference.

BACKGROUND OF THE INVENTION

1. Field of the Invention

This invention generally relates to bicycle hydraulic brake actuation device. More specifically, the present invention relates to bicycle hydraulic brake actuation device that provides improved braking characteristics in a braking system.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One system that has been extensively redesigned is the hydraulic brake system.

The bicycle hydraulic brake system typically includes the hydraulic brake actuation device, a rotor attached to one of the bicycle wheels and a caliper adjacent to the rotor with brake pads that selectively contact the rotor in response to changes in hydraulic pressure in the hydraulic brake actuation device.

The hydraulic brake actuation device typically has a housing mounted the bicycle handlebar. The housing includes a bore, a master piston disposed in the bore and a lever arm pivotally supported on the housing. Pivoting movement of the lever arm provides leverage for moving the master piston causing changes in the hydraulic pressure and movement of a slave piston in the caliper. Typically, the brake pads are spaced apart from braking surfaces of the rotor until urged into braking contact with the rotor by movement of the slave piston.

When the lever arm of the hydraulic brake actuation device is initially moved, braking contact is delayed because the brake pads must first move and close the gap between the brake pads and the braking surfaces of the rotor. The movement of the brake pads typically corresponds directly movement of the lever arm in a movement ratio. Specifically, for each angular degree of movement of the lever arm, there is a corresponding movement of the brake pads.

It is desirable to have the brake pads move quickly toward the braking surfaces of the rotor in order to provide rapid braking response. However, in conventional hydraulic brake actuation devices, movement of the pads to the rotor requires an undesirable amount of lever arm travel.

In view of the above, it will be apparent to those skilled in the art from this disclosure that there exists a need for an improved hydraulic brake actuation device that provides improved ratio of the movement of the brake pads relative to the movement of the lever arm. This invention addresses this need in the art as well as other needs, which will become apparent to those skilled in the art from this disclosure.

SUMMARY OF THE INVENTION

One object of the present invention is to provide a hydraulic brake actuation device with an improved master piston movement response.

Another object of the present invention is to provide push rod/roller and lever configuration within a hydraulic brake actuation device that improves braking response.

The foregoing objects can basically be attained by providing a bicycle hydraulic brake actuation device with a hydraulic master cylinder housing having a bore, a master piston movably mounted in the bore, a push rod, a lever and a reach adjustment mechanism. The push rod is operatively coupled to the master piston for reciprocative movement of the master piston in the hydraulic master cylinder between a neutral position and a braking position. The lever pivotally is attached to the housing for pivotal movement between an at rest position and a brake actuation position. The reach adjustment mechanism is coupled to the lever for movement therewith to operatively engage the push rod and adjust the at rest position of the lever relative to the housing. The reach adjustment mechanism is arranged such that a first lever ratio remains constant regardless of adjustments to the at rest position of the lever, the first lever ratio being defined as a linear movement distance of the master piston relative to an angular movement distance of the lever with the lever proximate at the rest position and the piston proximate the neutral position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 17 is a perspective view of the lever and the push rod of the hydraulic brake actuation device showing a pair of cam surfaces of the lever in contact with a pair of rollers of the push rod in accordance with the second embodiment of the present invention;

FIG. 18 is a perspective view of a lever and a push rod of a hydraulic brake actuation device showing a single cam surface of a lever in contact with a single roller of a push rod in accordance with a third embodiment of the present invention;

FIG. 20 is a top view of a hydraulic brake actuation device in accordance with a fourth embodiment of the present invention;

FIG. 21 is a front view of the hydraulic brake actuation device in accordance with the fourth embodiment of the present invention;

FIG. 30 is a front view of a lever of the lever assembly shown removed from the hydraulic brake actuation device in accordance with the fourth embodiment of the present invention;

FIG. 31 is a top view of the lever of the lever assembly shown removed from the hydraulic brake actuation device in accordance with the fourth embodiment of the present invention;

FIG. 32 is a cross-sectional view of one end of the lever of the lever assembly showing an elongated bore dimensioned to receive the reach adjustment mechanism in accordance with the fourth embodiment of the present invention;

FIG. 33 is a perspective view of the one end of the lever of the lever assembly showing the elongated bore from a different angle in accordance with the fourth embodiment of the present invention;

FIG. 36 is a side view of the block member of the reach adjustment mechanism shown removed from the lever assembly in accordance with the fourth embodiment of the present invention;

FIG. 37 is a cross-sectional view of the block member of the reach adjustment mechanism taken along the line 37-37 in FIG. 36 in accordance with the fourth embodiment of the present invention;

FIG. 38 is a perspective view of a rod plate of the push rod, shown removed from the hydraulic brake actuation device in accordance with the fourth embodiment of the present invention;

FIG. 42 is a cross-sectional view similar to FIG. 27 of the hydraulic brake actuation device showing lever assembly and master piston in a neutral or at rest position in accordance with the fourth embodiment of the present invention; and FIG. 43 is a cross-sectional view similar to FIG. 42 of the hydraulic brake actuation device showing lever assembly and master piston in a braking position or brake actuation position in accordance with the fourth embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
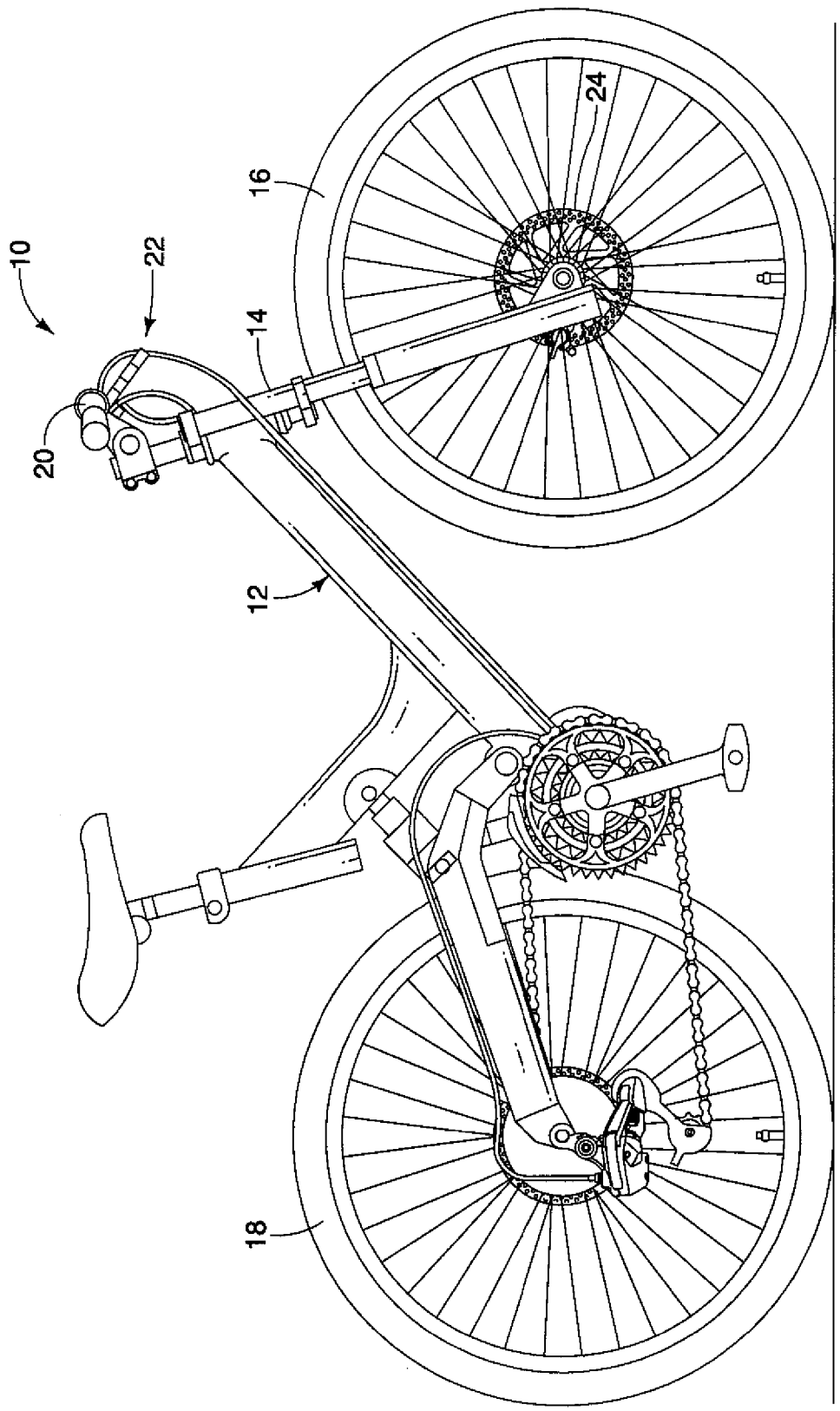
FIG. 1 is a side view of a bicycle that includes a hydraulic brake actuation device in accordance with the present invention.

Referring initially to FIG. 1, a bicycle 10 is illustrated in accordance with a first embodiment of the present invention. Among other things, the bicycle 10 includes a frame 12, a front fork 14, a front wheel 16, a rear wheel 18, a handlebar 20 and a hydraulic braking system 22. The front fork 14 is pivotally supported on the frame 12. The front wheel 16 is rotatably supported on the front fork 14 and the rear wheel 18 is rotatably supported on a rear portion of the frame 12 in a conventional manner.

The description below of the hydraulic braking system 22 is directed to a braking system configured for applying a braking force to the front wheel 16. However, it should be understood that from the drawings and the description herein that the bicycle 10 includes a separate braking system configured for applying a braking force to the rear wheel 18. Since front and rear bicycle brake systems have the same components and operate in the same manner, only the hydraulic brake system 22 installed for applying a braking force to the front wheel 16 is described herein for the sake of brevity. Specifically, the description herein of the hydraulic braking system 22 applies to both front and rear braking systems.

Figure 2:
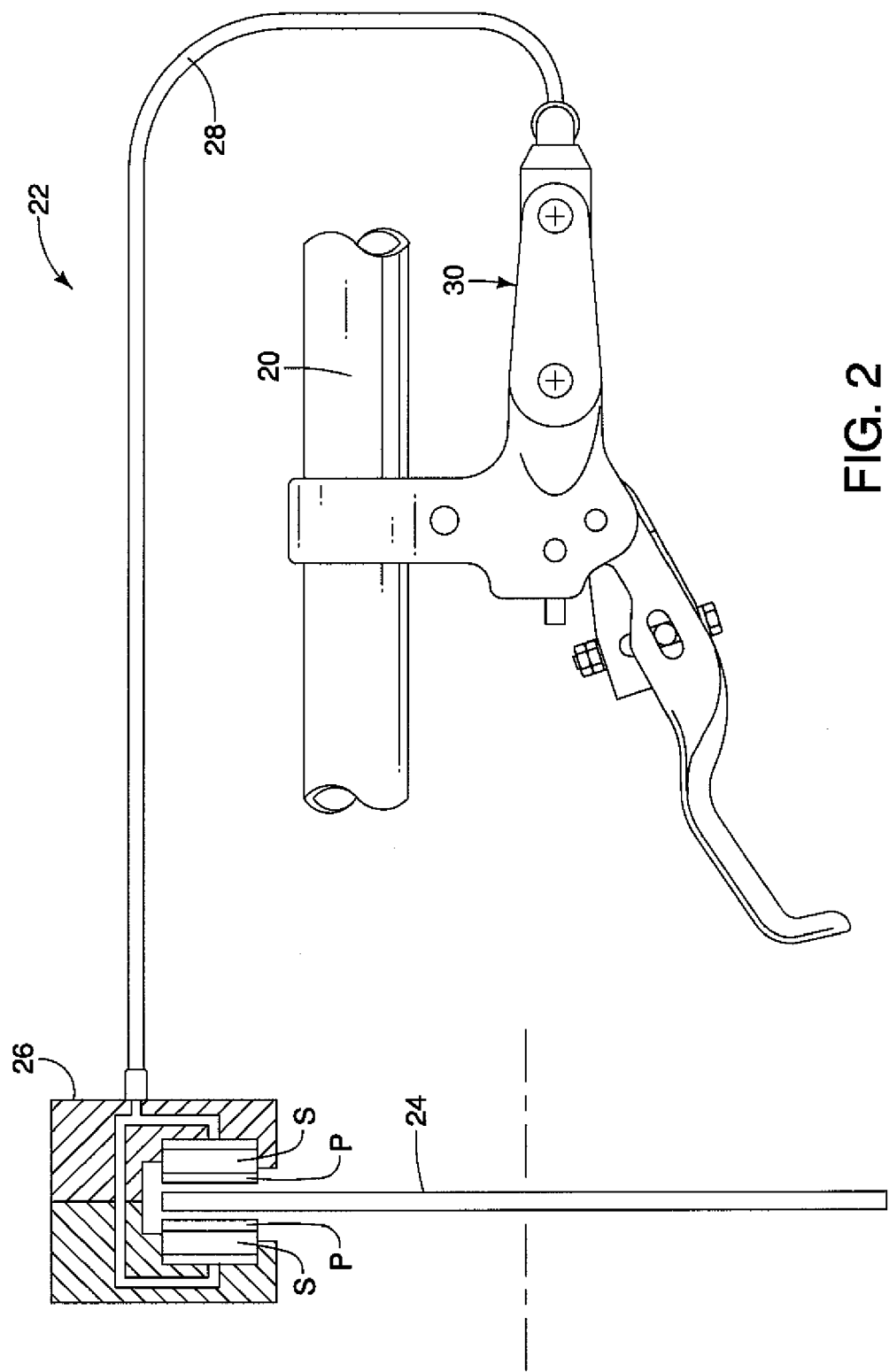
FIG. 2 is a schematic view of the hydraulic brake actuation device showing the hydraulic brake actuation device operably connected to a brake caliper in accordance with a first embodiment of the present invention.
Figure 3:
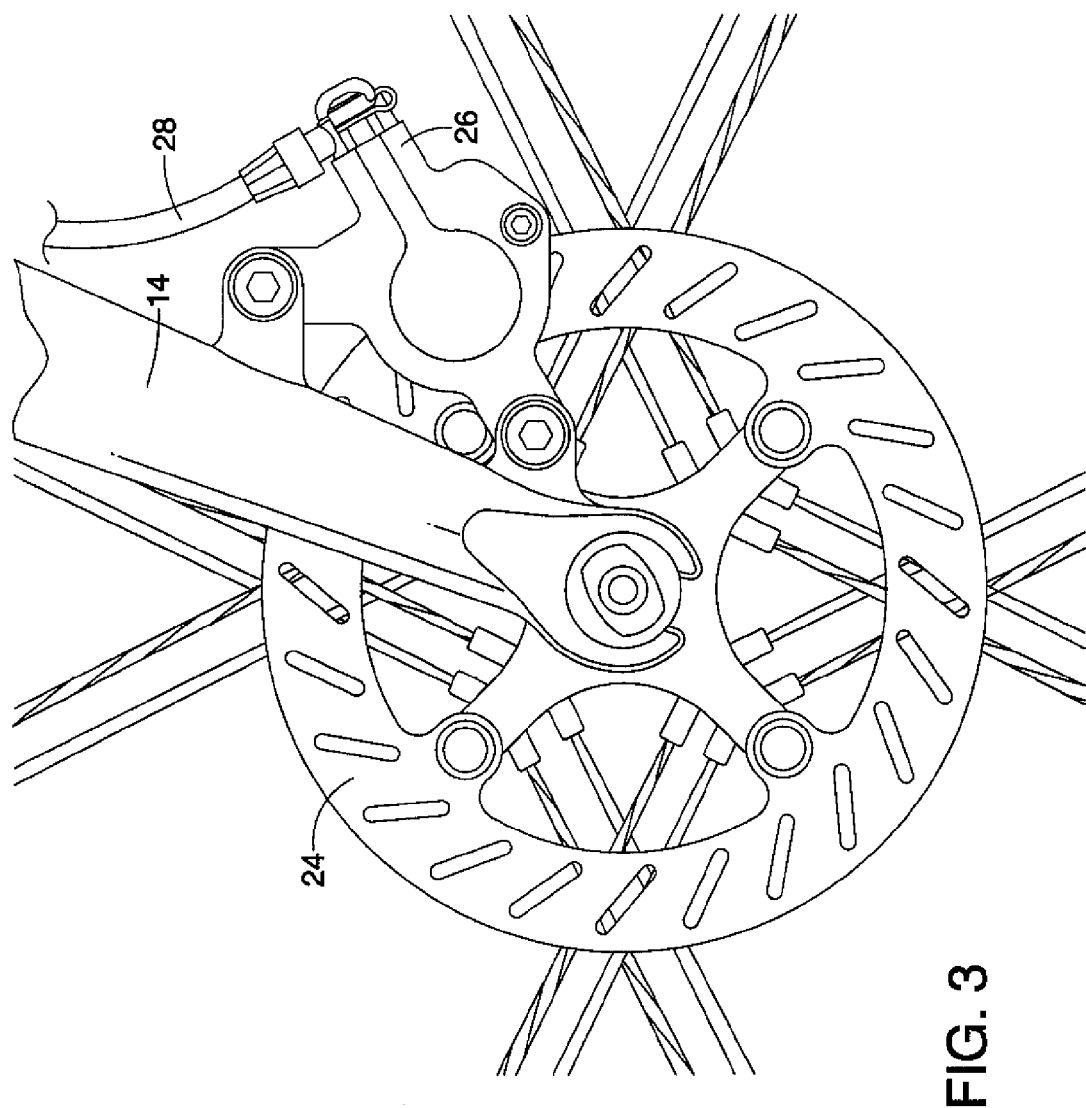
FIG. 3 is a side view of a portion of a front wheel of the bicycle depicted in FIG. 1 showing the brake caliper and a brake rotor in accordance with a first embodiment of the present invention.

As shown in FIG. 2, the hydraulic braking system 22 basically includes a rotor 24, a brake caliper 26, a hydraulic line 28 and a hydraulic brake actuation device 30. The brake caliper 26 is a slave cylinder and the hydraulic brake actuation device 30 is a master cylinder in the hydraulic braking system 22. As shown in FIG. 3, the rotor 24 is attached to the front wheel 16. The brake caliper 26 is fixed to the front fork 14 adjacent to the rotor 24 in a conventional manner.

Referring again to FIG. 2, the brake caliper 26 includes a slave piston S and brake pads P. The hydraulic line 28 is connected to both the brake caliper 26 and the hydraulic brake actuation device 30 such that increases in fluid pressure within the hydraulic brake actuation device 30 directed to the brake caliper 26 cause the slave piston S to move, thereby moving the brake pads P into contact with the rotor 24 and applying a braking force the front wheel 16. As also shown in FIG. 2, the hydraulic brake actuation device 30 is secured to the handlebar 20.

With specific reference to FIGS. 4-10, a detailed description of the hydraulic brake actuation device 30 in accordance with the present invention is now provided.

Figure 5:
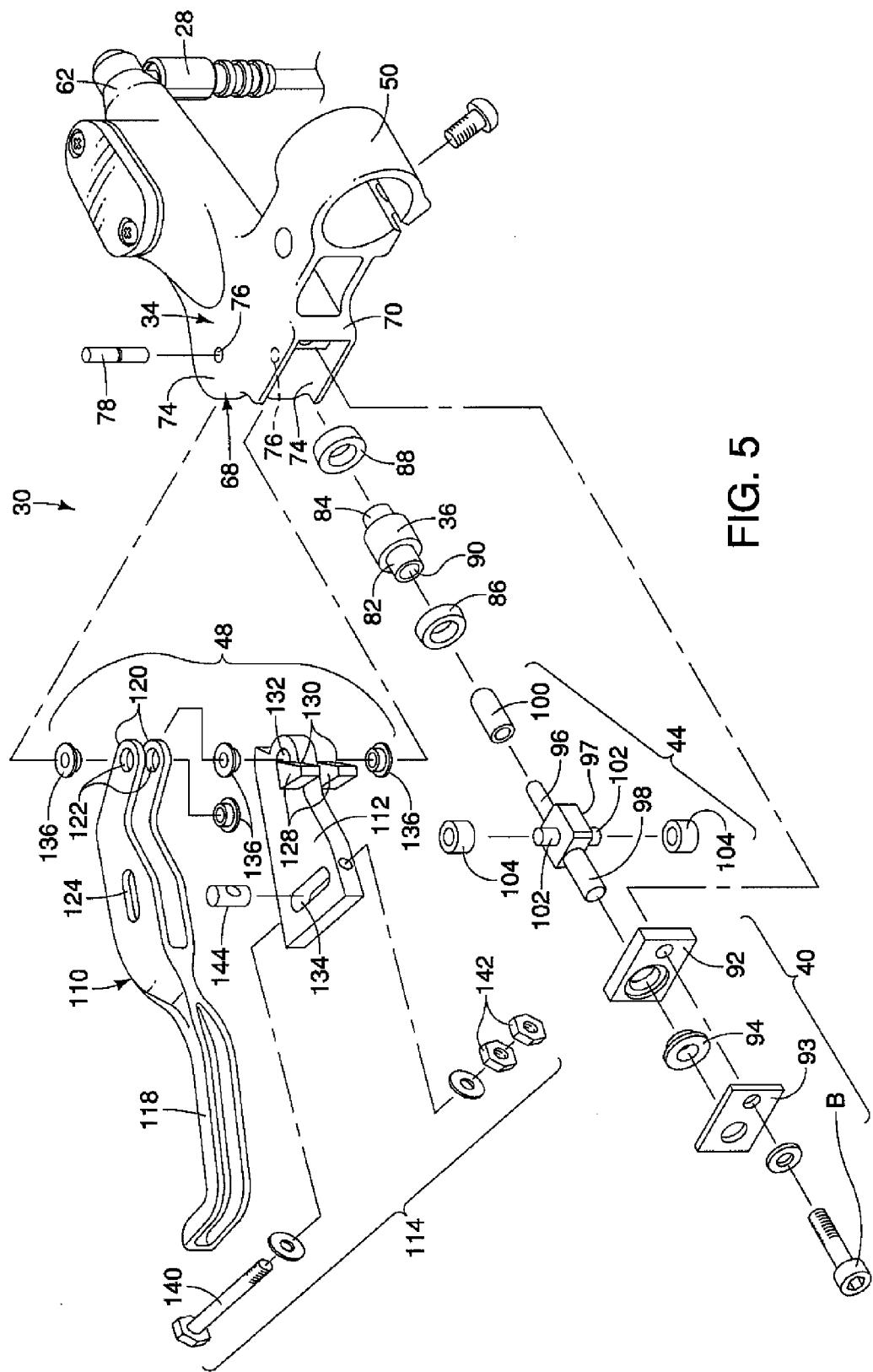
FIG. 5 is a perspective exploded view of the hydraulic brake actuation device in accordance with the first embodiment of the present invention.
Figure 6:
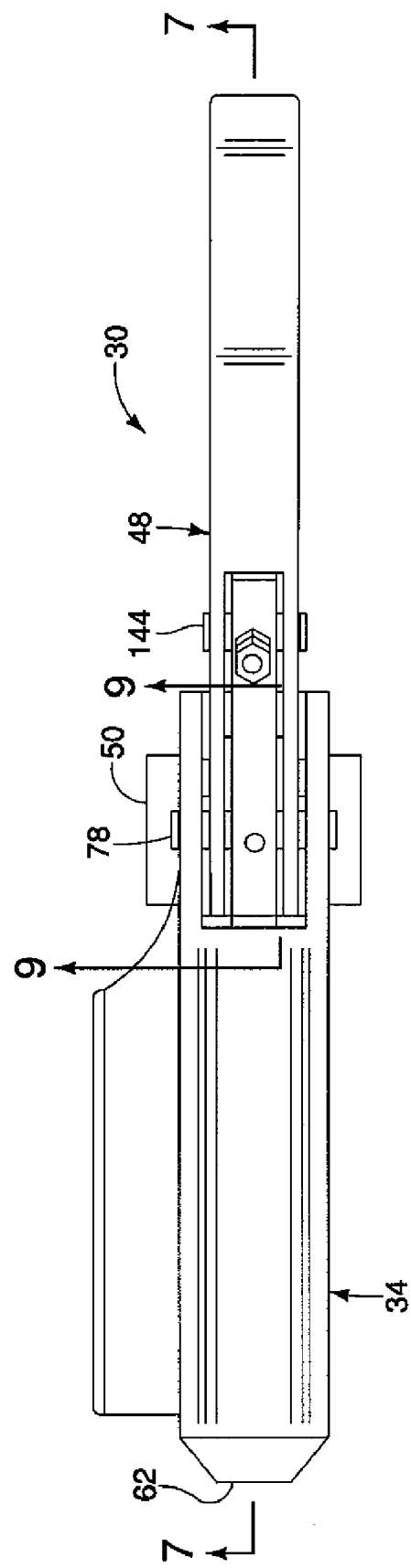
FIG. 6 is a side elevational view of the hydraulic brake actuation device in accordance with the first embodiment of the present invention.

As best shown in FIG. 5, the hydraulic brake actuation device 30 basically includes a hydraulic master cylinder housing 34, a piston 36, a movement restricting portion 40, a push rod 44 and a lever assembly 48.

Figure 4:
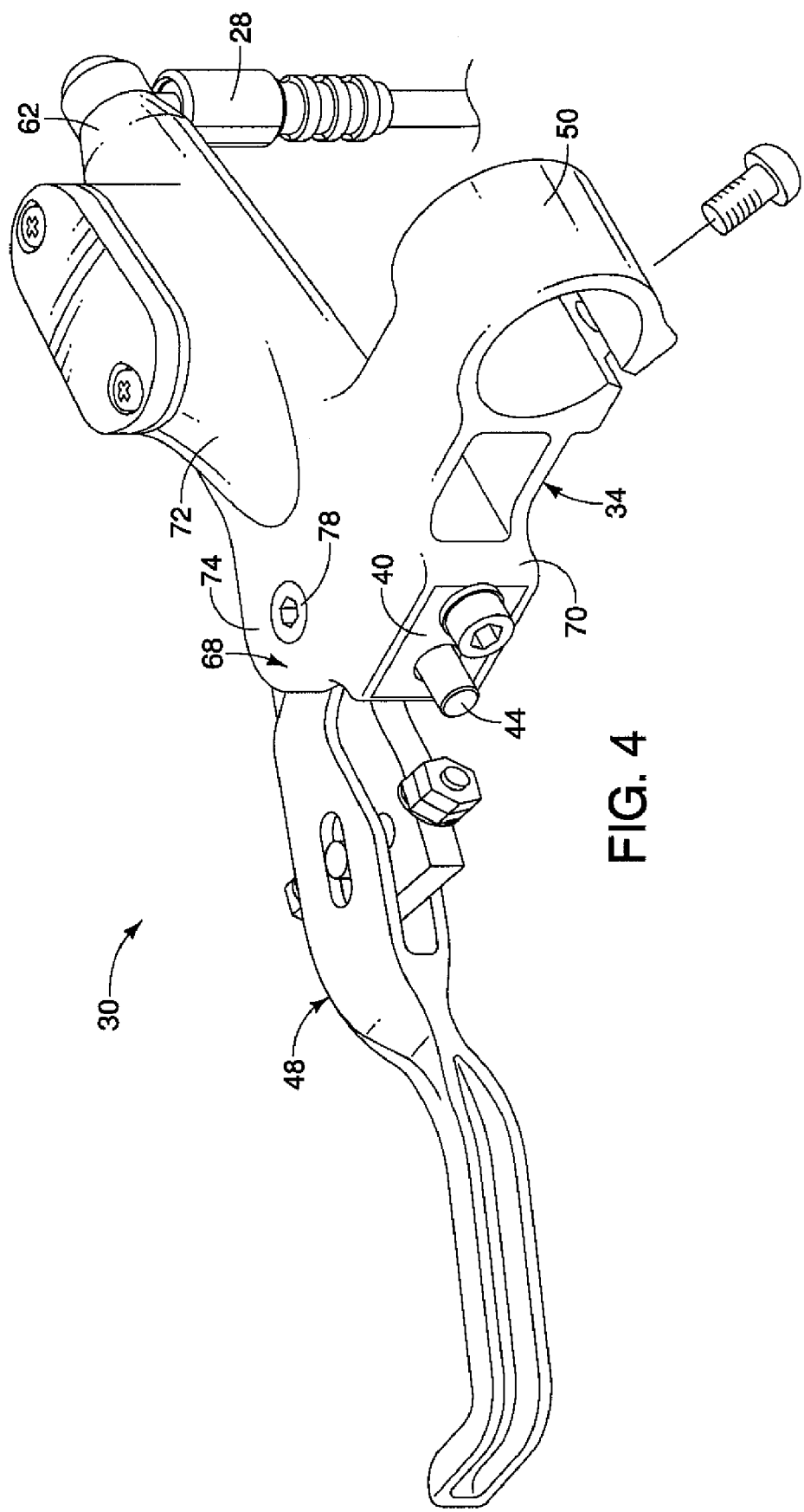
FIG. 4 is a perspective view of the hydraulic brake actuation device shown removed from the bicycle in accordance with the first embodiment of the present invention.
Figure 7:
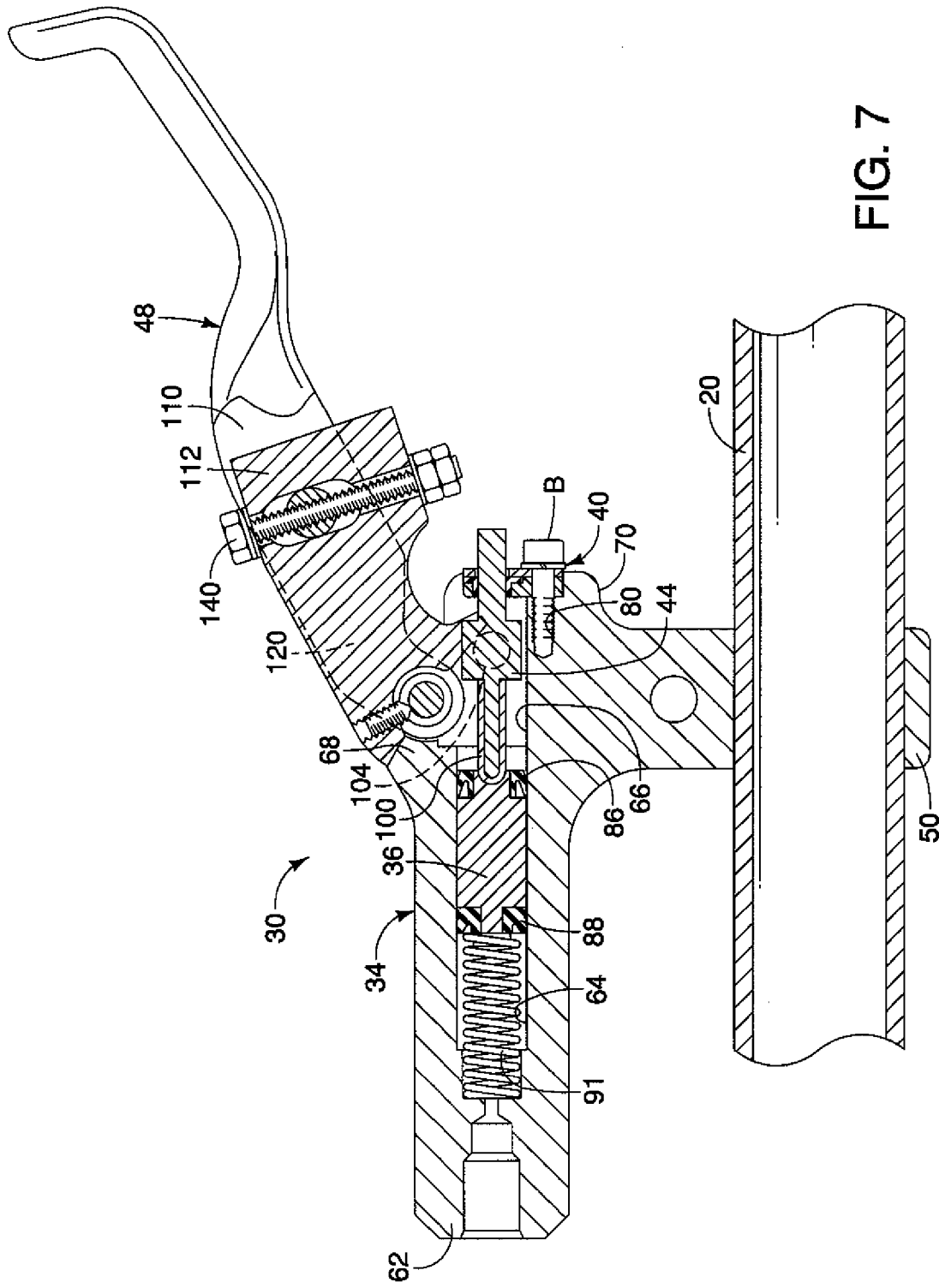
FIG. 7 is a cross-sectional view of the hydraulic brake actuation device taken along the line 7-7 in FIG. 6 showing details of a lever, a push rod and a piston with the lever in an at rest position and the piston in a neutral position in accordance with the first embodiment of the present invention.
Figure 8:
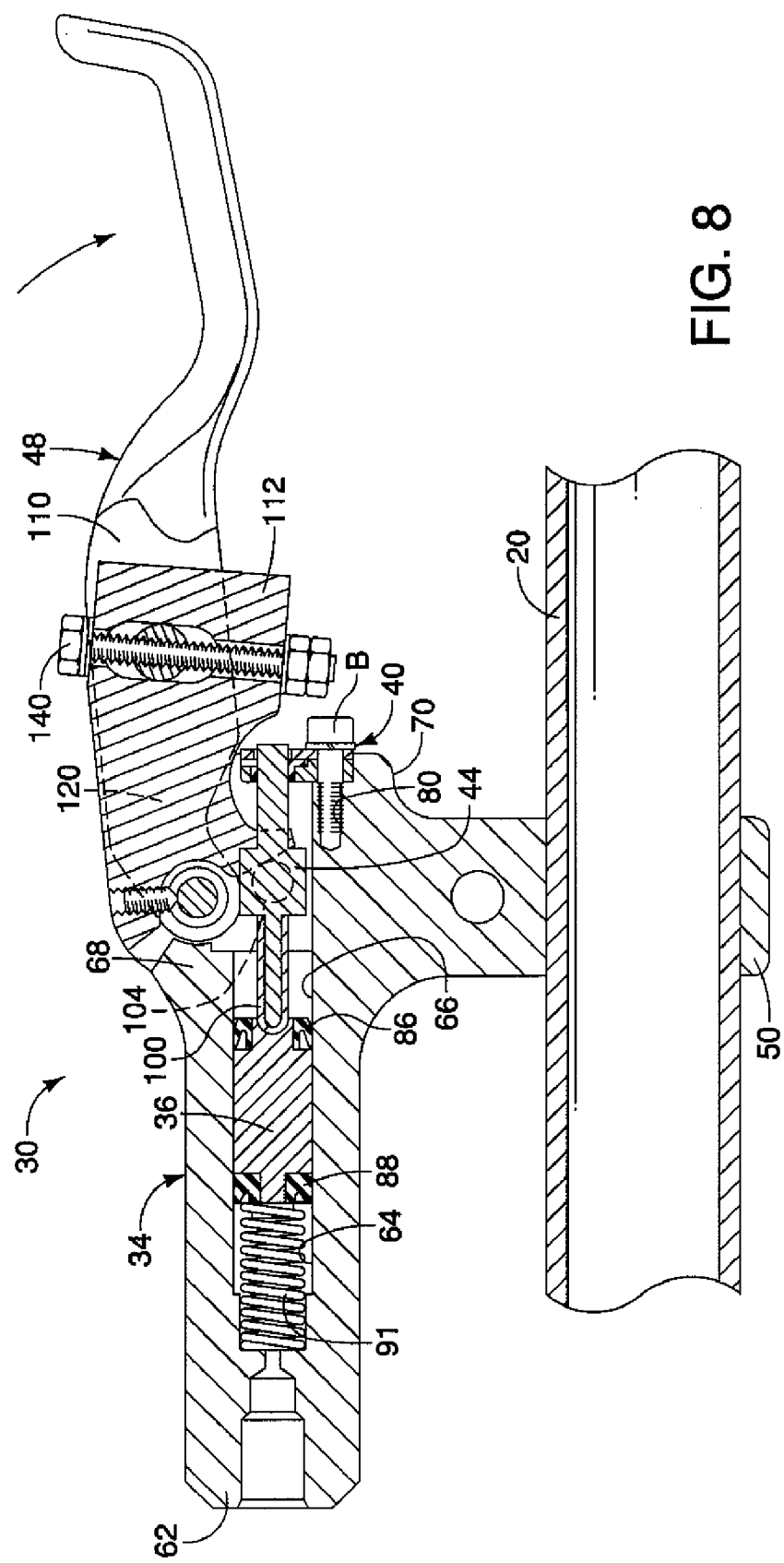
FIG. 8 is a cross-sectional view of the hydraulic brake actuation device similar to FIG. 7, with the lever in a brake actuation position and the piston in a braking position in accordance with the first embodiment of the present invention.

As best shown in FIGS. 7 and 8, the hydraulic master cylinder housing 34 basically includes a handlebar attachment portion 50, a hydraulic line attachment end 62, a cylinder bore 64, a recess 66, a lever supporting portion 68 and a push rod supporting end 70. As best shown in FIG. 4, the hydraulic master cylinder housing 34 also includes a brake fluid reservoir 72.

Figure 9:
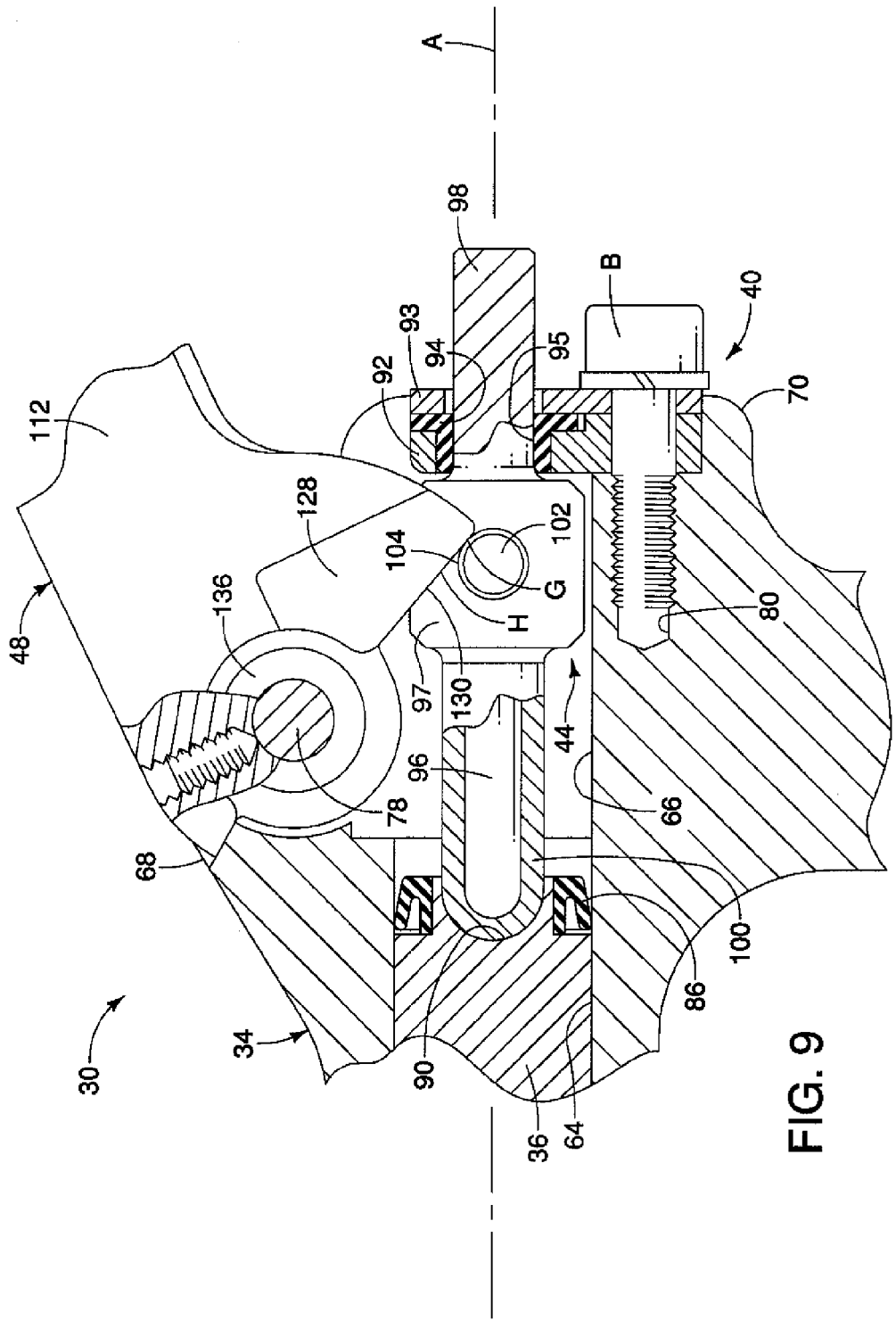
FIG. 9 is a cross-sectional view of the hydraulic brake actuation device taken along the line 9-9 in FIG. 6 showing a cam surface on the lever in contact with a roller of the push rod with the lever in the rest position and the piston in a neutral position in accordance with the first embodiment of the present invention.
Figure 10:
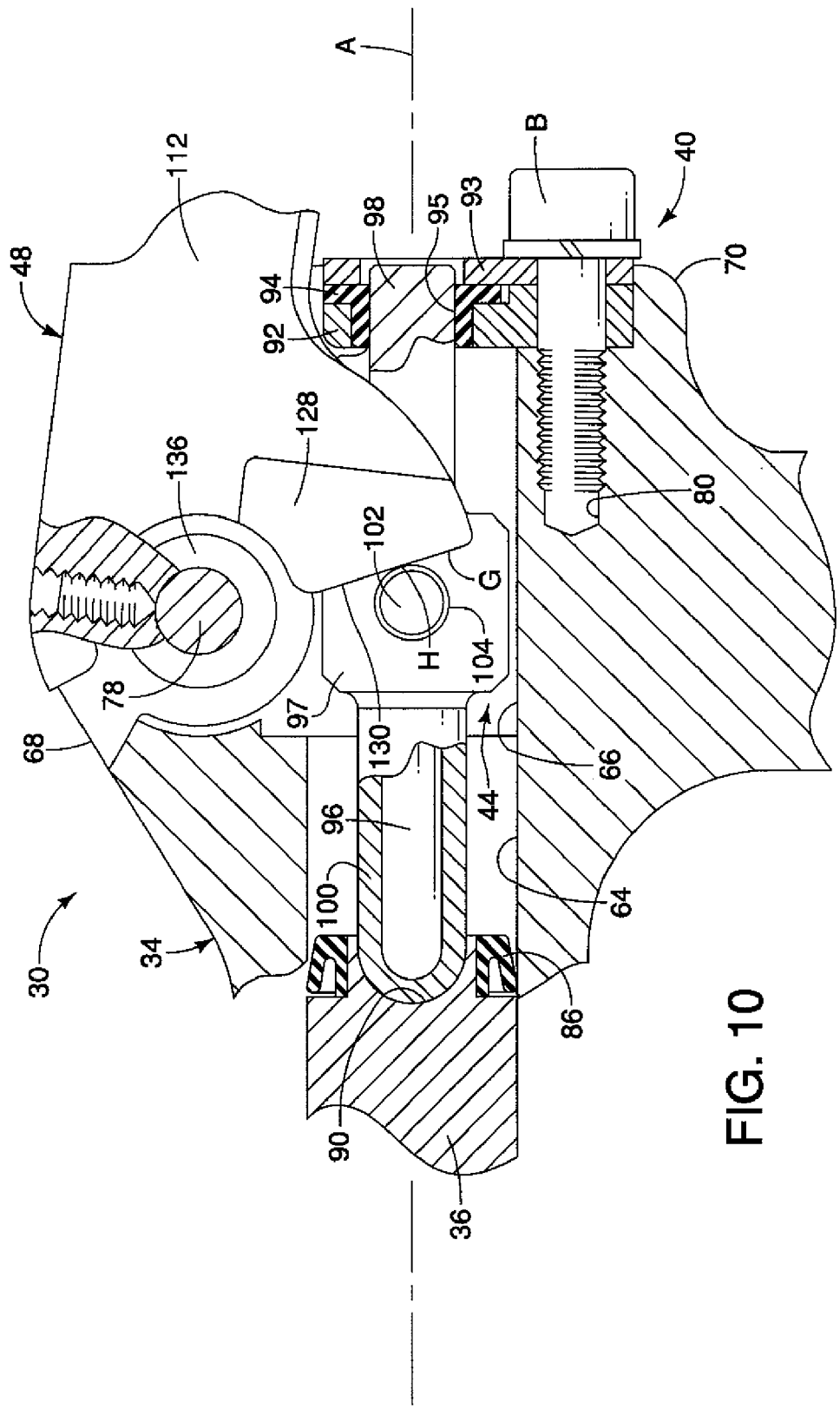
FIG. 10 is a cross-sectional view of the hydraulic brake actuation device similar to FIG. 9, with the lever in a brake actuation position and the piston in a braking position in accordance with the first embodiment of the present invention.

Returning again to FIGS. 7 and 8, the hydraulic line attachment end 62 is dimensioned to connect to the hydraulic line 28 in a conventional manner. As shown in FIGS. 9 and 10, the cylinder bore 64 defines an axis A and is dimensioned to receive the piston 36 such that the piston 36 slides within the cylinder bore 64 along the axis A. The recess 66 is dimensioned to receive the push rod 44 such that the push rod 44 can move within the recess 66 contacting a portion of the piston 36 as is described in greater detail below.

As best shown in FIG. 5, the lever supporting portion 68 is defined by two spaced apart side walls 74. The two side walls 74 are each formed with a bore 76. A pivot pin 78 is fitted into the bores 76 pivotally supporting the lever assembly 48 in a manner described in greater detail below. As shown in FIGS. 7-10, the push rod supporting end 70 of the hydraulic master cylinder housing 34 includes a threaded aperture 80.

With specific reference to FIGS. 5 and 7-10, a detailed description of the piston 36 is now described. The piston 36 serves as a master piston for the hydraulic braking system 22. Movement of the piston 36 (a master piston) causes corresponding movement of the slave piston S in the brake caliper 26 in accordance with corresponding increases in the fluid pressure within the hydraulic master cylinder housing 34.

The piston 36 is basically a cylindrically shaped member that basically includes seal receiving recesses 82 and 84 fitted with seals 86 and 88 and a push rod receiving end 90. The seals 86 and 88 are radial seals that extend around the outer circumference of the recesses 82 and 84. The seals 86 and 88 create a fluid seal between the cylinder bore 64 and the piston 36. The push rod receiving end 90 includes a concaved surface.

The piston 36 and the seals 86 and 88 are configured to move between a neutral position shown in FIGS. 7 and 9 and a braking position shown in FIGS. 8 and 10. The piston 36 serving as the master piston is biased into the neutral position (FIGS. 7 and 9) by a return spring 91 (FIGS. 7 and 8) that is also disposed within the cylinder bore 64. The piston 36 is further configured to move between the neutral position and the braking position along a movement axis that extends approximately parallel to the bicycle handlebar 20.

As shown in FIGS. 5 and 7-10, the movement restricting portion 40 includes a first plate 92, a second plate 93, a bushing 94 and a bolt B. The first plate 92 is formed with a recess dimensioned to receive the bushing 94. The bushing 94 includes a central opening that has an inner annular surface (see FIGS. 9 and 10) that defines a push rod guide surface 95, as described in greater detail below with the description of the push rod 44. The first plate 92 and second plate 93 include aligned apertures that receive the bolt B, such that the bolt B attaches the movement restricting portion 40 to the push rod supporting end 70 of the hydraulic master cylinder housing 34. Specifically, the bolt B threads into the threaded aperture 80. With the movement restricting portion 40 installed on the push rod supporting end 70 of the hydraulic master cylinder housing 34, the push rod guide surface 95 is preferably aligned with the cylinder bore 64 and with the direction of movement of the piston 36.

With specific reference to FIGS. 5 and 7-10, a description of the push rod 44 is now provided. The push rod 44 is configured to move the piston 36 and the seals 86 and 88 to the braking position (FIGS. 8 and 10) in order to increase fluid pressure within the cylinder bore 64 causing the slave piston S in the brake caliper 26 to move the braking pads P to exert a braking force on the rotor 24.

As best shown in FIG. 5, the push rod 44 basically includes a piston contact portion 96, a lever contact portion 97 and a guided portion 98, with the lever contact portion 97 being disposed between the contact portion 96 and the guided portion 98. The piston contact portion 96 includes a cap 100 that is preferably made of a friction reducing material has an opening shaped to fit onto the piston contact portion 96 and a master piston contact end that conforms to the concaved surface the push rod receiving end 90 of the piston 36. The push rod 44 is configured to move along a linear path approximately coaxial to movement of the piston 36.

The lever contact portion 97 is located in a longitudinal central portion of the push rod 44 and includes opposing shafts 102 that extend from opposite sides of the lever contact portion 97. The lever contact portion 97 further includes a pair of rollers 104, one roller 104 being installed on each of the shafts 102. The rollers 104 are spaced apart from one another on opposite sides of the lever contact portion 97. Consequently, the rollers 104 are supported for rotational movement at the longitudinal central portion of the push rod 44. The outer circumferential surface of the rollers 104 define a cam surface contacting portion, as described in greater detail below.

The rollers 104 can be made of metal, nylon or a friction reducing material. The rollers 104 can be rotatable sleeves as shown or can include internal bearings that contact the shafts 102 to provide smooth rolling about the shafts 102. The rollers 104 are cam rollers that are supported for rotational movement on the shafts 102 as described in greater detail below.

The guide portion 98 of the push rod 44 is basically an elongated rod or shaft that contacts the push rod guide surface 95. Specifically, the guide portion 98 extends through the bushing 94 such that the annular shape of the push rod guide surface 95 encircles a section of the guide portion 98 of the push rod 44. Consequently, the push rod 44 is confined between the push rod guide surface 95 and the piston 36. Further, since the push rod 44 is so confined, the push rod 44 is restricted to linear movement in coaxial alignment with the axis A of the cylinder bore 64 corresponding to the direction of movement of the piston 36. As such, the hydraulic master cylinder housing 34 therefore includes the movement restricting portion 40 that receives a portion of the push rod 44. The movement restricting portion 40 is configured to limit the push rod 44 to linear movement.

With reference to FIGS. 5, 7 and 8, a description of the lever assembly 48 is now provided. The lever assembly 48 is pivotally attached to the hydraulic master cylinder housing 34 for pivotal movement about the pivot pin 78 between an at rest position shown in FIG. 7 and a brake actuation position shown in FIG. 8. The lever assembly 48 basically includes a lever member 110, a block member 112 and a reach adjustment mechanism 114. The lever member 110 includes a grip end 118 and a pair of generally parallel extensions 120 extending from the grip end 118. Each of the extensions 120 is formed with an aperture 122 at a pivot end thereof, with the apertures 122 being coaxially aligned. Each of the extensions 120 is further formed with an elongated opening 124 which is a part of the reach adjustment mechanism 114.

The block member 112 includes a cam surface that is defined on a pair of cam protrusions 128. Each cam protrusion 128 has a cam surface area 130. The two cam surface areas 130 define the cam surface of the block member 112. The block member 112 also includes an aperture 132 about which the block member 112 pivots, and an elongated slot 134 that is part of the reach adjustment mechanism 114.

The lever assembly 48 is pivotally supported on the lever supporting portion 68 of the hydraulic master cylinder housing 34 by the pivot pin 78. Specifically, bushings 136 are installed in each of the apertures 122 of the lever member 110 and in the aperture 132 of the block member 112. With the block member 112 inserted between the extensions 120 of the lever member 110 and the aperture 132 aligned with the apertures 122, the lever assembly 48 is inserted between the two spaced apart side walls 74 of the lever supporting portion 68. With the apertures 112 and 132 and the bores 76 in the side walls 74 aligned, the pivot pin 78 is fitted into the apertures 112 and 132 and the bores 76 thereby pivotally supporting the lever assembly 48 on the hydraulic master cylinder housing 34.

The reach adjustment mechanism 114 basically includes a bolt 140, nuts 142 and a pin 144. The pin 144 is inserted into the elongated slot 134 and elongated opening 124 and the bolt 140 is inserted into holes formed in the block member 144 and through a threaded hole formed in the pin 144. The reach adjustment mechanism 114 provides a reach adjustment feature to adjust the at rest position of the lever member 110.

As is shown in FIGS. 9 and 10, the cam surface areas 130 (contact surface) are configured and arranged to move the push rod 44 as the lever assembly 48 is pivoted between the at rest position (FIG. 9) and the brake actuation position (FIG. 10). As should be clear from the drawings, the cam surface areas 130 are spaced apart in order to extend to opposite sides of the push rod 44 and contact the rollers 104 (the cam surface contacting portion). The cam surface areas 130 are generally planar, however it should be understood from the drawings and the description herein that the cam surfaces can alternatively have a curved or arcuate contour.

As can be clearly seen in FIG. 9, the rollers 104 contact the cam surface areas 130 at a point G. In FIG. 10, the rollers 104 contact the cam surface areas 130 at a point H. The point G is farther away from the pivot pin 78 than the point H. A simple kinematics analysis of the movement of the lever assembly 48 verses the movement of the piston 36 (and the push rod 44) shows that there are at least two different lever ratios defined by their respective movements.

A first lever ratio is defined as a linear movement distance of the piston 36 relative to an angular movement distance of the lever assembly 48 with the lever assembly 48 proximate the at rest position (for example, with rollers 104 in contact with the cam surface areas 130 in the vicinity of the point G) and the piston 36 proximate the neutral position (FIG. 9).

A second lever ratio is defined as a linear movement distance of the piston 36 relative to an angular movement distance of the lever assembly 48 with the lever assembly 48 proximate the brake actuation position (for example, with rollers 104 in contact with the cam surface areas 130 in the vicinity of the point H) and the piston 36 proximate the braking position (FIG. 10). The first lever ratio is different from the second lever ratio. Specifically, the first lever ratio is greater than the second lever ratio.

Figure 19:
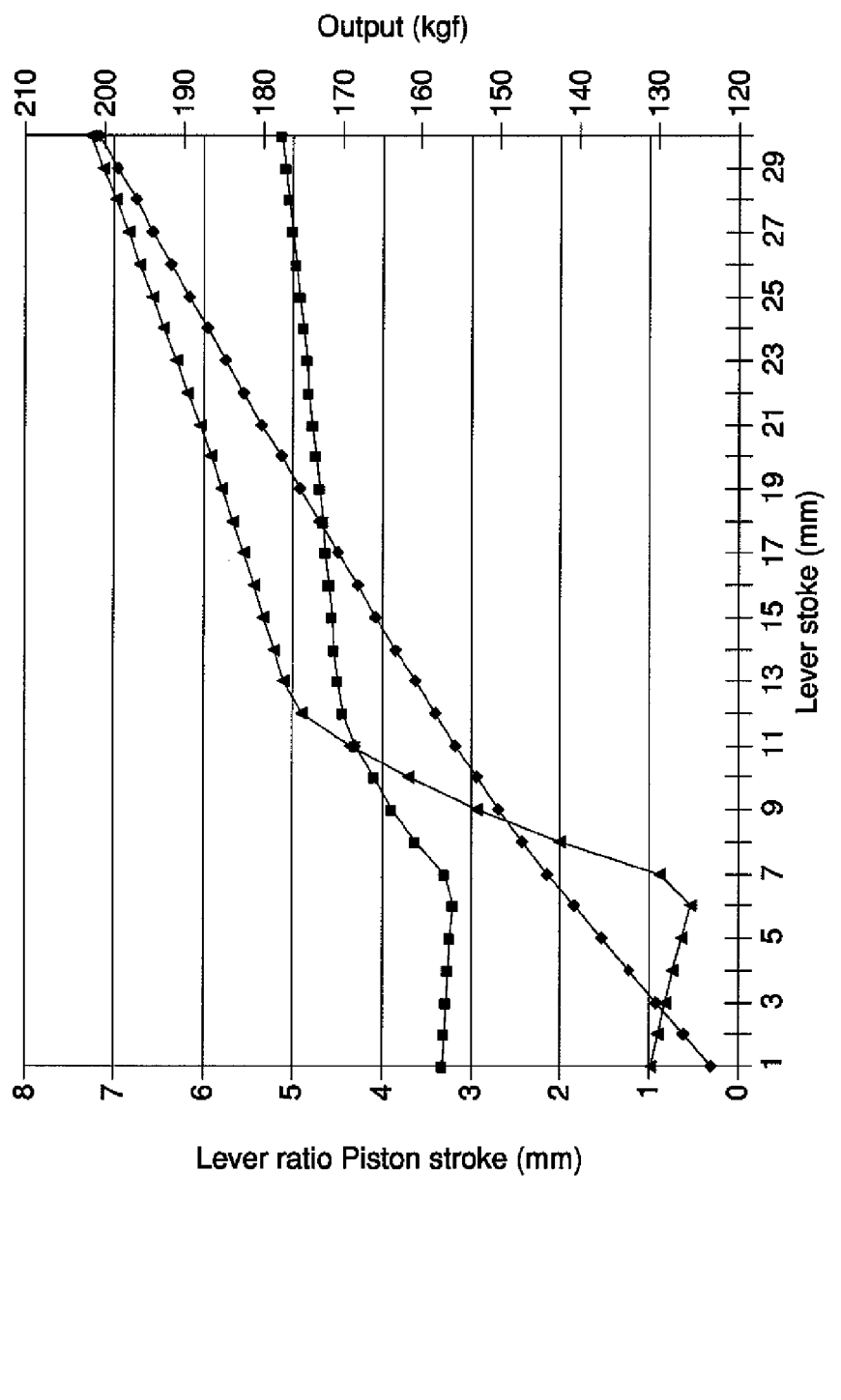
FIG. 19 is a table showing movement of the piston (piston stroke), the ratio of lever movement to piston movement and the braking force output in accordance with a third embodiment of the present invention.

The chart in FIG. 19 shows data corresponding to the first and second lever ratios with the left hand portion of the chart between the Lever Stroke (mm) distances of about 1-6 mm corresponding approximately to the conditions defining the first lever ratio and the left hand side of the chart beginning at Lever Stroke (mm) distances of greater than about 7 mm corresponding to the second lever ratio which is greater than the first lever ratio.

Second Embodiment

Referring now to FIGS. 11-17, a hydraulic brake actuation device 230 of a hydraulic braking system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 11:
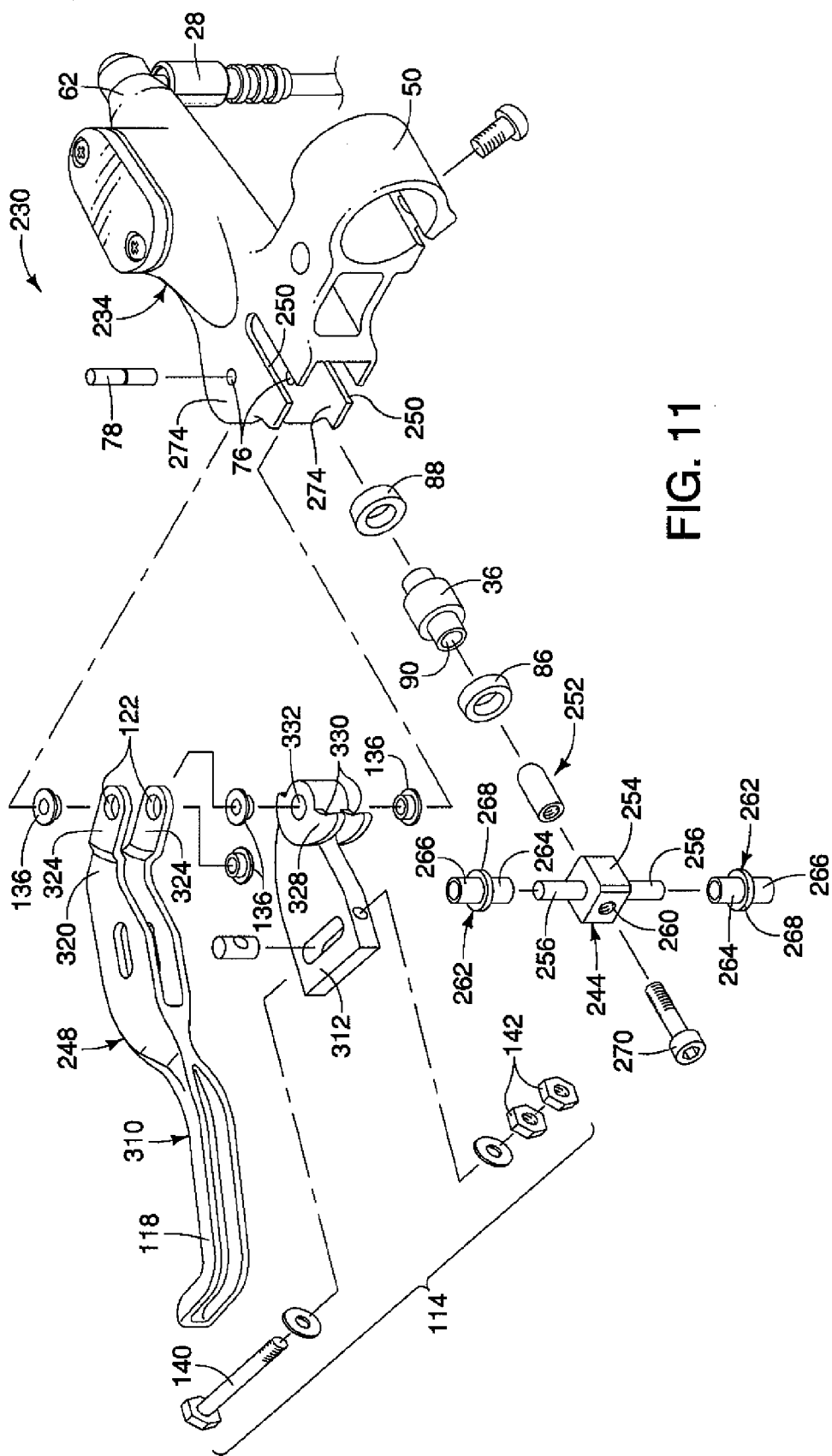
FIG. 11 is a perspective exploded view similar to FIG. 5, showing a hydraulic brake actuation device in accordance with a second embodiment of the present invention.
Figure 12:
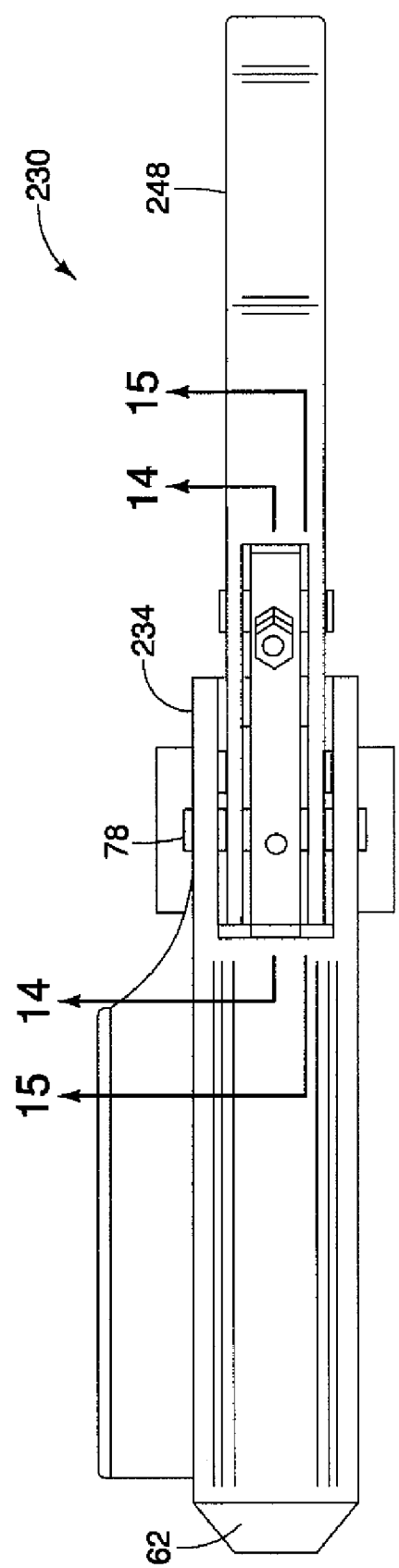
FIG. 12 is a side elevational view of the hydraulic brake actuation device depicted in FIG. 11 in accordance with the second embodiment of the present invention.
Figure 13:
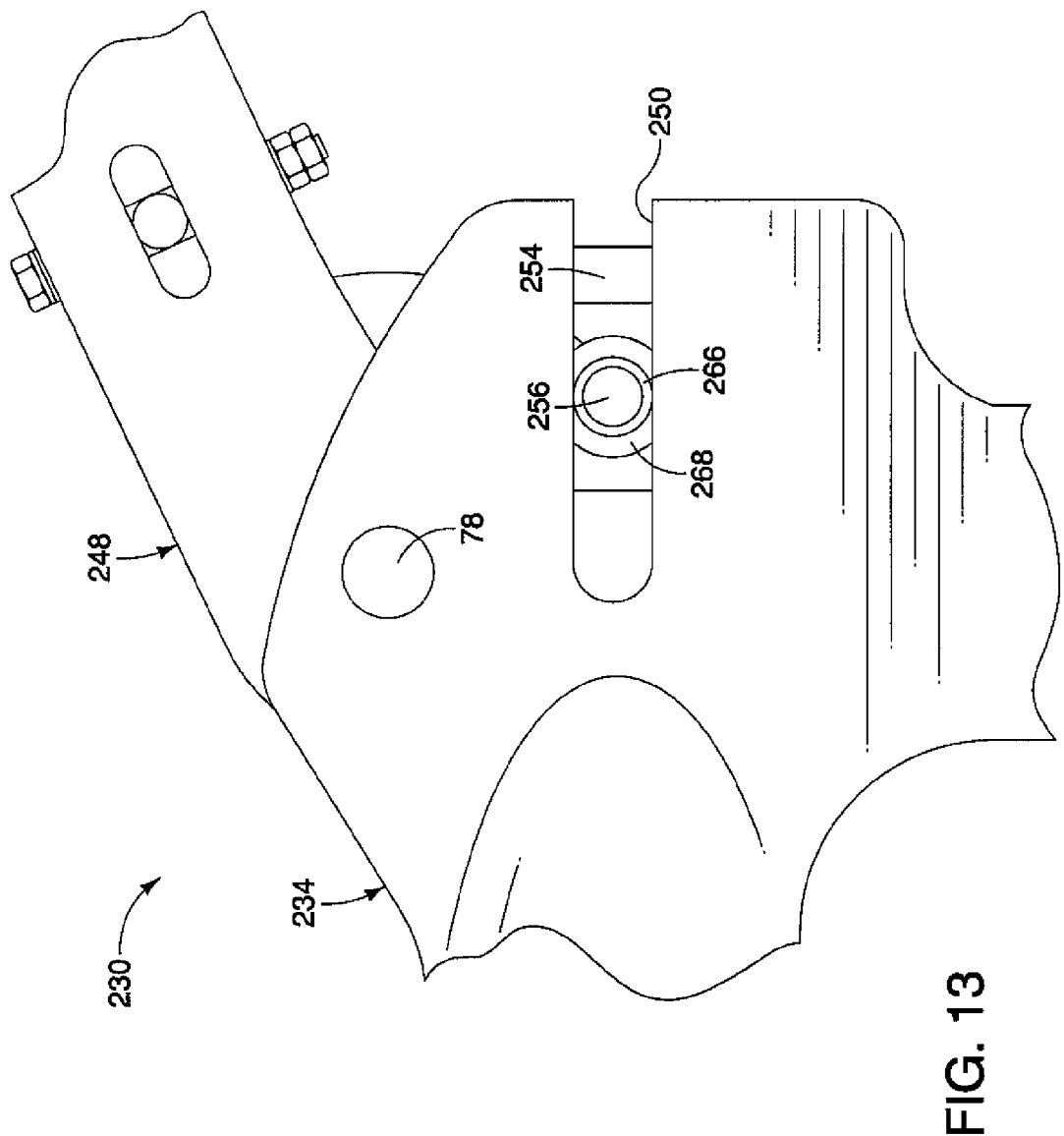
FIG. 13 is a fragmentary side view of the hydraulic brake actuation device depicted in FIGS. 11 and 12 in accordance with the second embodiment of the present invention.

As shown in FIG. 11, the hydraulic brake actuation device 230 has many features identical to the first embodiment. For instance, the hydraulic brake actuation device 230 includes the piston 36 but does not include the movement restricting portion 40 of the first embodiment. The hydraulic brake actuation device 230 does include a hydraulic master cylinder housing 234, a push rod 244 and a lever assembly 248 that include modification when compared to their counterparts in the first embodiment.

The hydraulic master cylinder housing 234 has many features that are identical to those of the hydraulic master cylinder housing 34 of the first embodiment, except the side walls 74 and the push rod supporting end 70 of the first embodiment have been modified. Specifically, the hydraulic master cylinder housing 234 includes side walls 274 that include slots 250 forming part of a movement restricting portion. Further, the threaded aperture 80 of the push rod supporting end 70 of the hydraulic master cylinder housing 34 of the first embodiment has been eliminated. Otherwise, the master cylinder housing 234 has the same features as the master cylinder housing 34 of the first embodiment.

The push rod 244 basically includes a piston contact portion 252 and a lever contact portion 254. The piston contact portion 252 has a hollow interior and a master piston contact end that conforms to the concaved surface the push rod receiving end 90 of the piston 36. The lever contact portion 254 includes a pair of shafts 256 that extend from opposite sides of the lever contact portion 254 and a central threaded aperture 260. A pair of rollers 262 is disposed on the shafts 256. Each roller 262 includes a first roller area 264, a second roller area 266 and an annular protrusion 268 extending therebetween. The rollers 262 are configured such that the first roller areas 264 serve as cam surface contact portions, the second roller areas 266 extend into the slots 250. The annular protrusion 268 contacts an inner surface of the side walls 274 to guide the push rod 244 thereby preventing side to side movement of the push rod 244.

Specifically, the second roller areas 266 and the slots 250 define a movement restricting portion and a push rod supporting end that restricts the push rod 244 to linear movement within the hydraulic master cylinder housing 234. The second roller areas 266 and the slots 250 further serve as a guide portion of the push rod 244.

Figure 14:
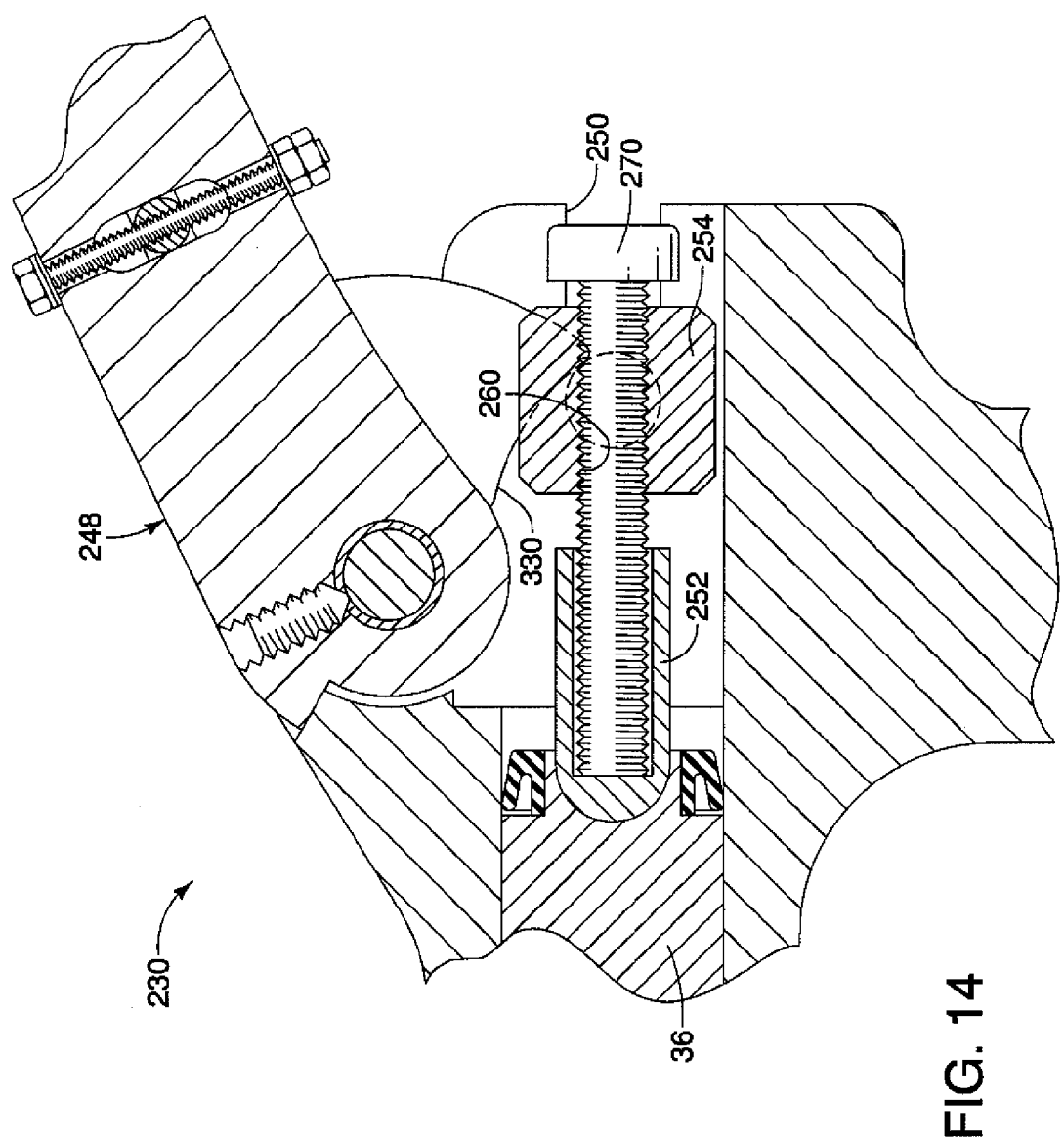
FIG. 14 is a cross-sectional view of the hydraulic brake actuation device taken along the line 14-14 in FIG. 12 showing details of a lever, a push rod and a piston with the lever in an at rest position and the piston in a neutral position in accordance with the second embodiment of the present invention.

An adjuster bolt 270 is installed into the central threaded aperture 260 of the lever contact portion 254 of the push rod 244. The adjuster bolt 270 is dimensioned such that a portion of the adjuster bolt 270 extends through the central threaded aperture 260. An exposed portion of the adjuster bolt 270 extends into the hollow interior of the piston contact portion 252 as shown in FIG. 14 and provides a positioning adjustment between the push rod 244 and piston 36.

Figure 15:
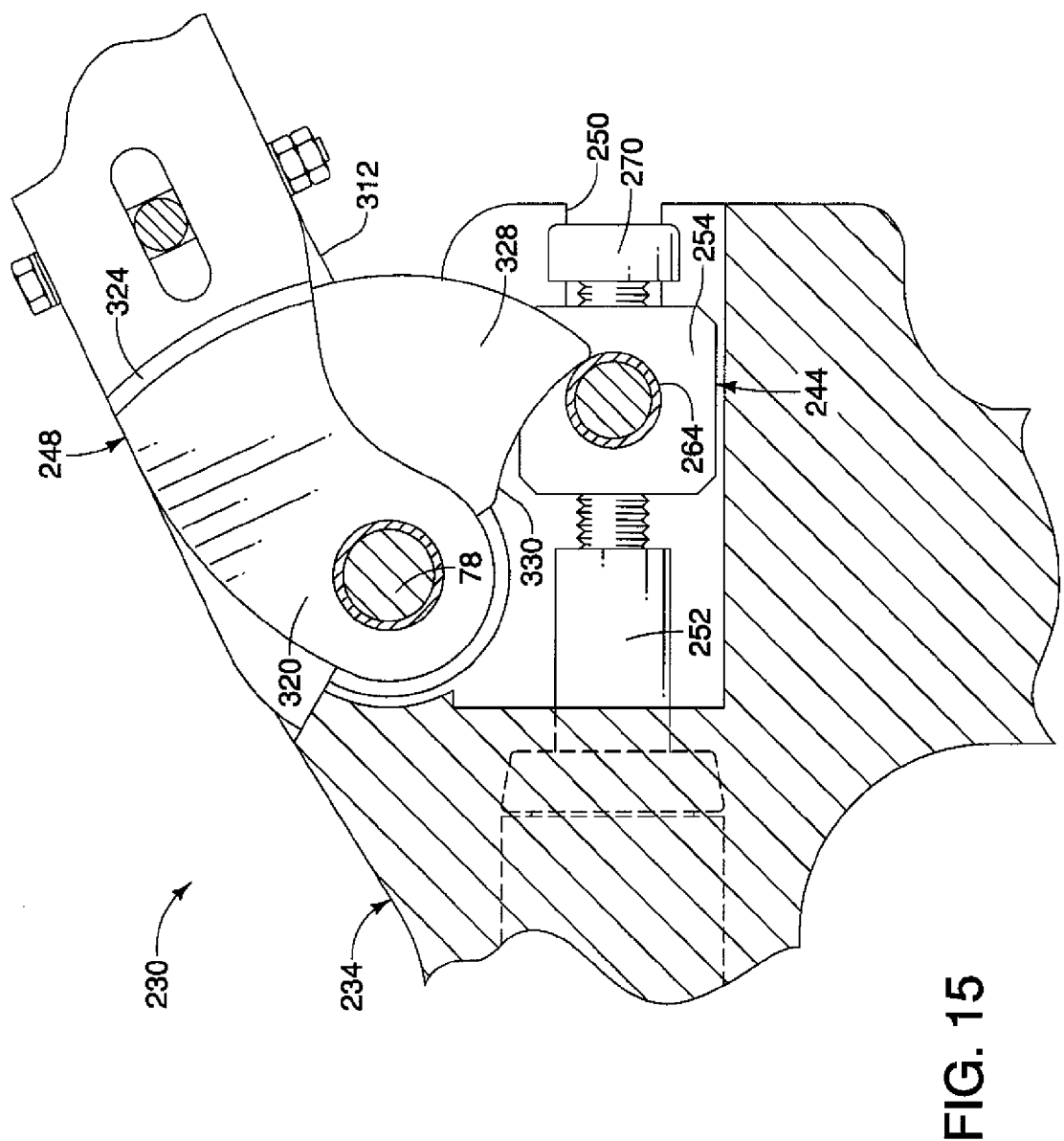
FIG. 15 is a cross-sectional view of the hydraulic brake actuation device taken along the line 15-15 in FIG. 12 showing a cam surface on the lever in contact with a roller of the push rod with the lever in the rest position and the piston in a neutral position in accordance with the second embodiment of the present invention.
Figure 16:
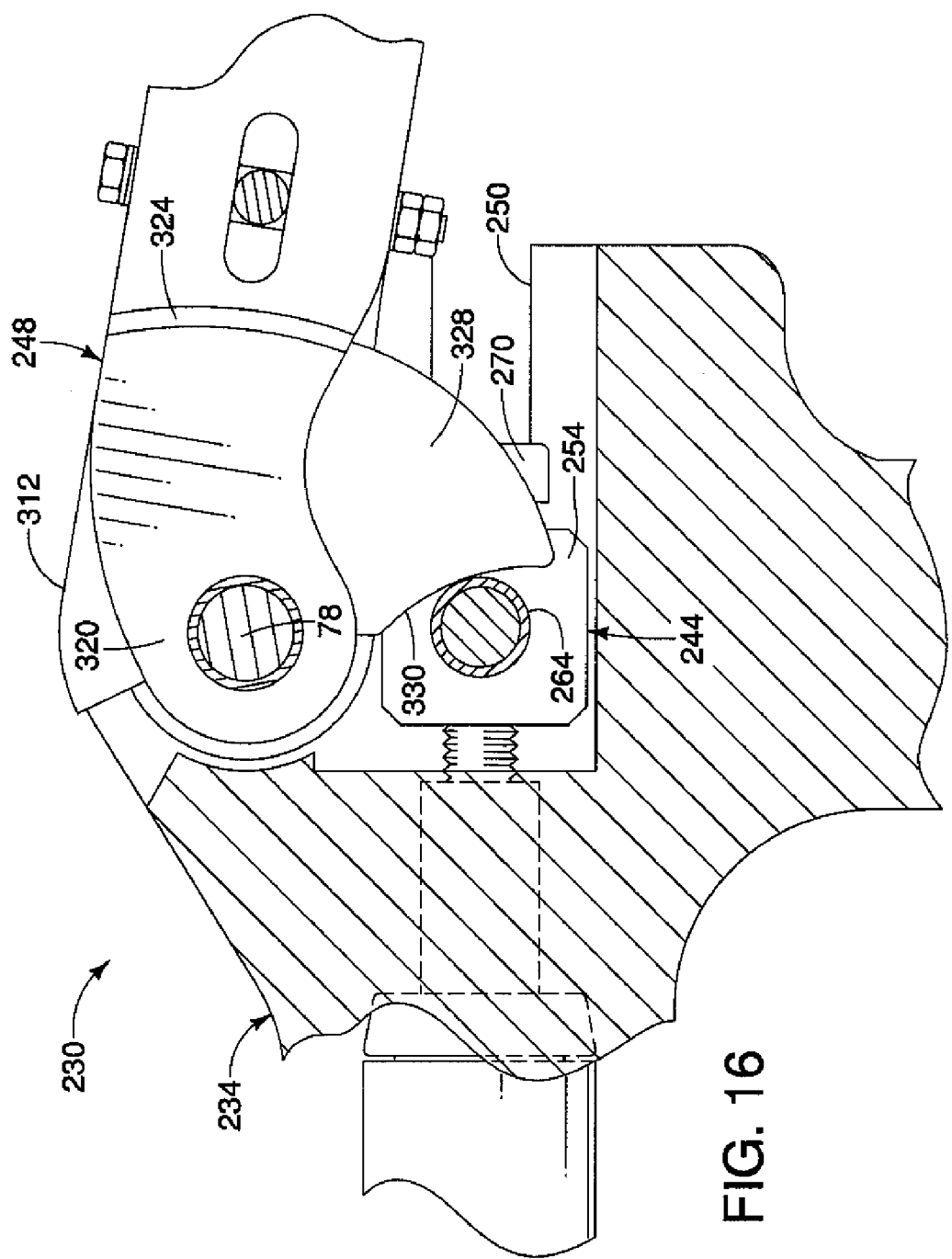
FIG. 16 is a cross-sectional view of the hydraulic brake actuation device similar to FIG. 15, with the lever in a brake actuation position and the piston in a braking position in accordance with the second embodiment of the present invention.

As shown in FIGS. 15 and 16, the lever assembly 248 is pivotally attached to the hydraulic master cylinder housing 234 by the pivot pin 78 for pivotal movement between an at rest position shown in FIG. 15 and a brake actuation position shown in FIG. 16. As shown more clearly in FIG. 11, the lever assembly 248 basically includes a lever member 310, a block member 312 and the reach adjustment mechanism 114. The lever member 310 includes the grip end 118 and a pair of generally parallel extensions 320 extending from the grip end 118. Each of the extensions 320 are similar to the extensions 120 of the first embodiment, but have been modified to include an offset 324. Offsets 324 are formed with the apertures 122.

With reference again to FIGS. 15 and 16, the block member 312 includes a cam surface that is defined on a pair of cam protrusions 328. Each cam protrusion 328 has a cam surface area 330. The two cam surface areas 330 define the cam surface of the block member 312. As shown more clearly in FIG. 11, the block member 312 also includes an aperture 332 and the elongated slot 134 which is part of the reach adjustment mechanism 114.

The lever assembly 248 is pivotally supported on the hydraulic master cylinder housing 234 by the pivot pin 78. Specifically, bushings 136 are installed in each of the apertures 122 of the lever member 310 and in the aperture 332 of the block member 312. Further, the pivot pin 78 is inserted into the bores 76, the aperture 332 and the apertures 122 to support the lever assembly 248 on the hydraulic master cylinder housing 234.

As is shown in FIGS. 15 and 16, the cam surface areas 330 (contact surface) are configured and arranged to move the push rod 244 as the lever assembly 248 is pivoted between the at rest position (FIG. 15) and the brake actuation position (FIG. 16). As should be clear from the drawings, the cam surface areas 330 are spaced apart in order to extend to opposite sides of the push rod 244 and contact the second roller areas 266 of the rollers 262. It should be noted that the cam surface areas 330 are contoured or arcuate in shape thereby further enhancing the first and lever ratios defined above with respect to the first embodiment.

Third Embodiment

Referring now to FIG. 18, a hydraulic brake actuation device 430 of a hydraulic braking system in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The hydraulic brake actuation device 430 is identical to the hydraulic brake actuation device 30 of the first embodiment except that the block member 112 has been replaced with a block member 435 and the push rod 44 has been replaced with a push rod 440. The block member 435 includes only a single cam surface area 445. The push rod 440 includes a cam surface contacting portion 445 that includes first and second support walls 450 with a single roller 455 rotatably supported therebetween, the roller being configured to contact the cam surface area 445.

Fourth Embodiment

Referring now to FIGS. 20-38, a hydraulic brake actuation device 530 of a hydraulic braking system in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The bicycle hydraulic brake actuation device 530 includes a hydraulic master cylinder housing 534, a master piston 536 (FIGS. 22 and 26), a push rod 544 (FIGS. 22, 26 and 27), a lever assembly 548 that includes a reach adjustment mechanism 550.

Figure 22:
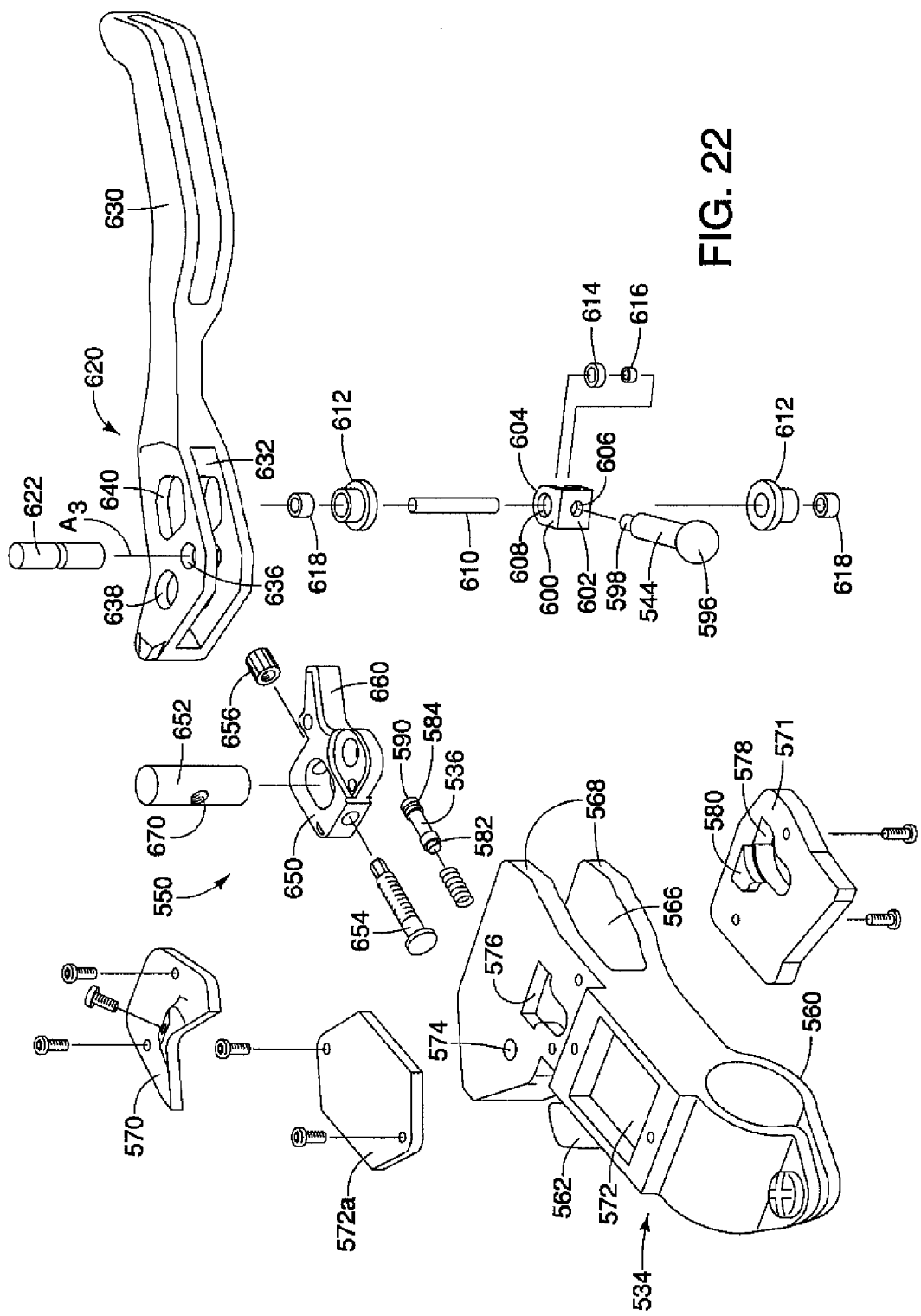
FIG. 22 is an exploded perspective view of the hydraulic brake actuation device showing a master piston, a push rod, a lever assembly and a reach adjustment mechanism in accordance with the fourth embodiment of the present invention.
Figure 26:
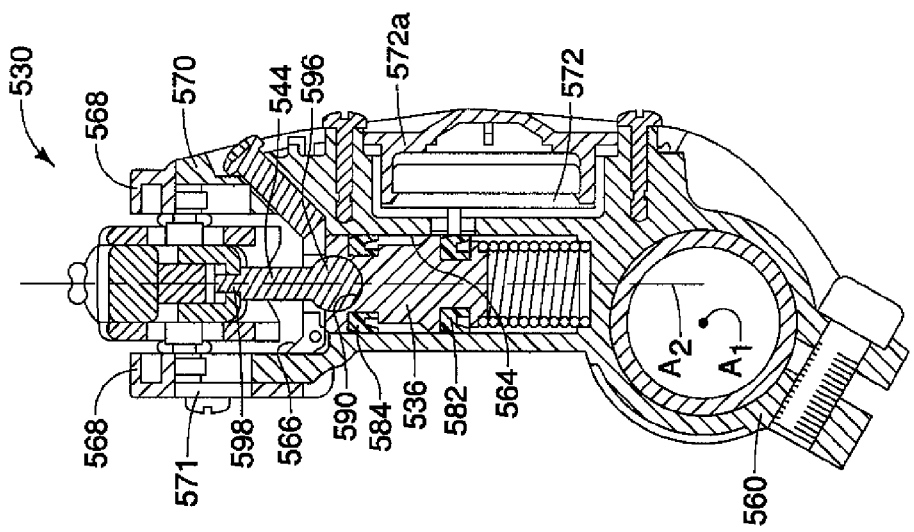
FIG. 26 is a cross-sectional view of the hydraulic brake actuation device taken along the line 26-26 in FIG. 20 showing portions of the master piston, the push rod and the lever assembly in accordance with the fourth embodiment of the present invention.
Figure 25:
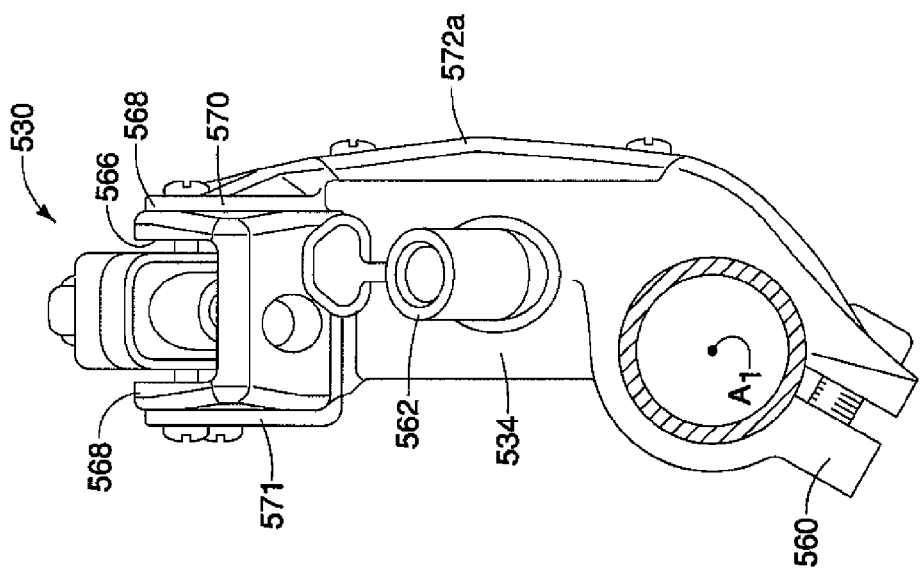
FIG. 25 is a second side view of the hydraulic brake actuation device in accordance with the fourth embodiment of the present invention.

As shown in FIGS. 22-26, the hydraulic master cylinder housing 534 includes a handlebar attachment portion 560, a hydraulic line attachment end 562 (FIGS. 22, 24 and 25), a cylinder bore 564 (FIG. 26 only), a recess 566, lever support portions 568, a upper side plate 570, a lower side plate 571 (FIGS. 22, 23, 25 and 26) and a brake reservoir 572 (FIGS. 22 and 26).

The handlebar attachment portion 560 is configured to clamp to the handlebar 20 in a conventional manner. At the point where the handlebar attachment portion 560 clamps to the handlebar 20, the handlebar 20 defines an axis $A_1$ (FIGS. 23-26). The hydraulic line attachment end 562 is configured to connect to a hydraulic line in a conventional manner. A small bore (not shown) fluidly connects the hydraulic line attachment end 562 to the cylinder bore 564 for transference of hydraulic pressure, in a conventional manner.

As shown in FIG. 26, the cylinder bore 564 defines an axis $A_2$. The axis $A_2$ is approximately perpendicular to the axis $A_1$. The master piston 536 is mounted or installed within the cylinder bore 564. The master piston 536 is configured to move between a neutral position (FIG. 42) and a braking position (FIG. 43) along the axis $A_2$ (a movement axis). Consequently, since the axis $A_2$ is perpendicular to the axis $A_1$, the master piston 536 moves in a direction that is approximately perpendicular to the bicycle handlebar 20.

Figure 27:
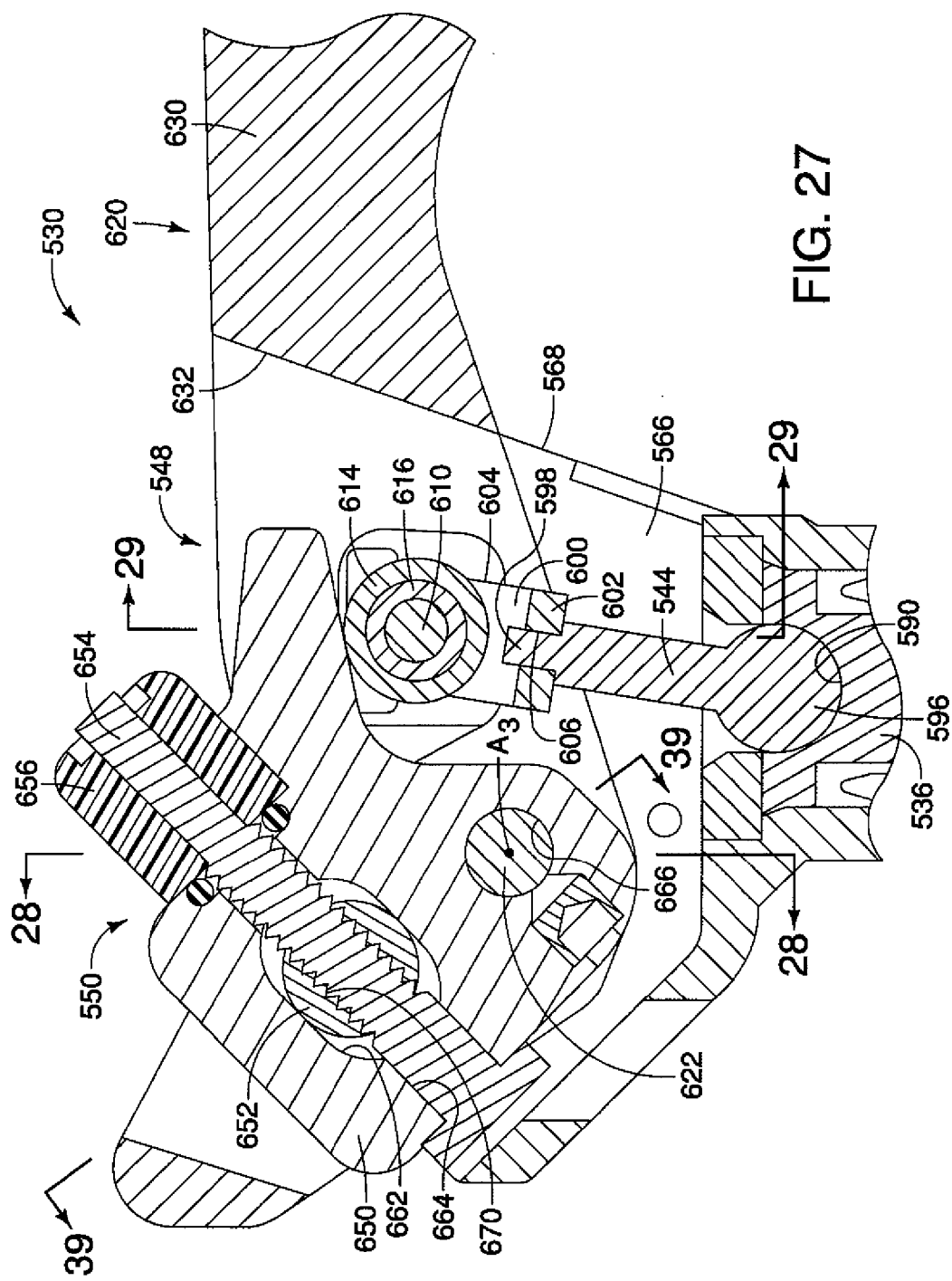
FIG. 27 is another cross-sectional view of the hydraulic brake actuation device taken along the line 27-27 in FIG. 21, showing features of the reach adjustment mechanism in accordance with the fourth embodiment of the present invention.
Figure 29:
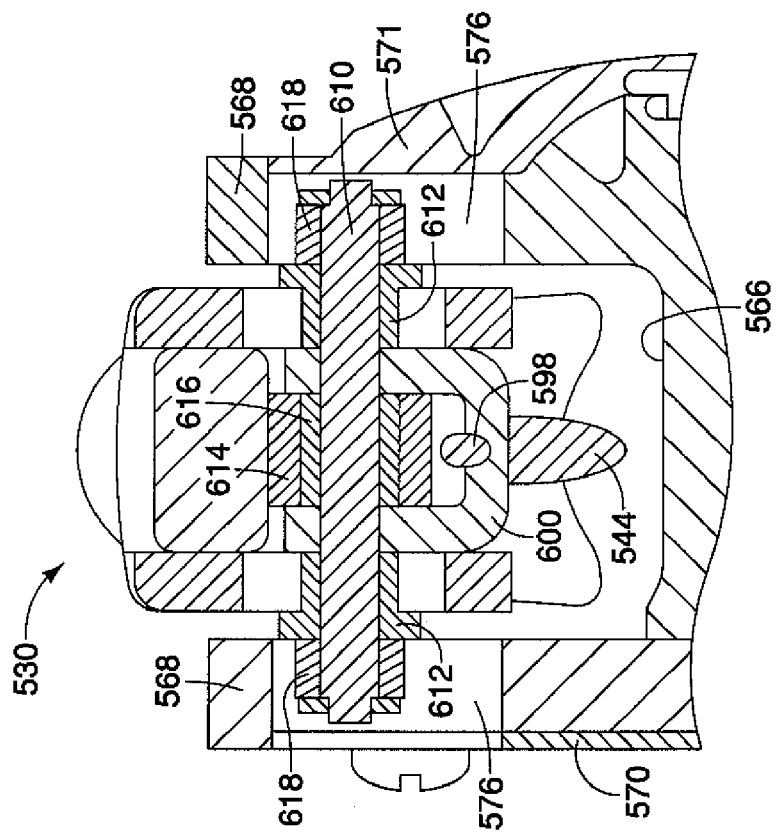
FIG. 29 is another cross-sectional view of the hydraulic brake actuation device taken along the line 29-29 in FIG. 27, showing cam rollers installed on a shaft that extends through portions of the lever assembly, a portion of the push rod and the reach adjustment mechanism in accordance with the fourth embodiment of the present invention.
Figure 28:
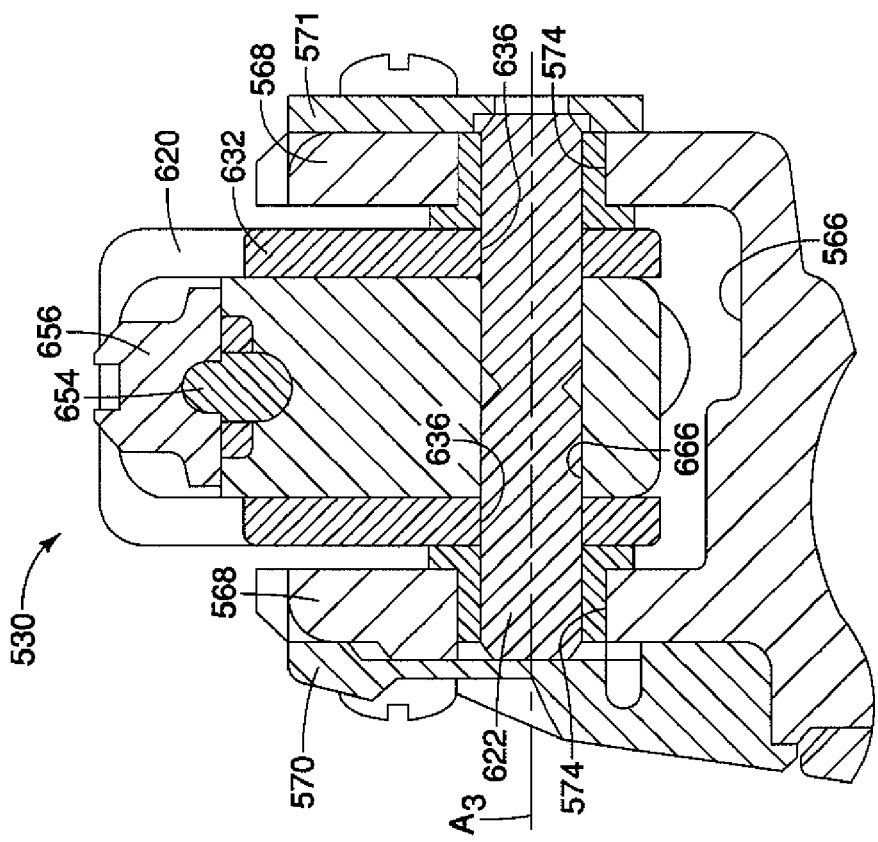
FIG. 28 is another cross-sectional view of the hydraulic brake actuation device taken along the line 28-28 in FIG. 27, showing features of lever assembly in accordance with the fourth embodiment of the present invention.
Figure 35:
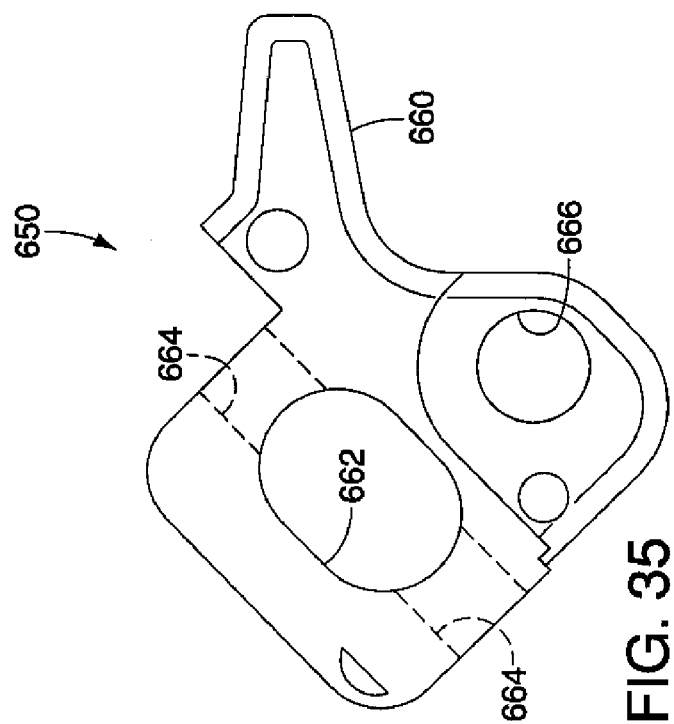
FIG. 35 is a top view of the block member of the reach adjustment mechanism shown removed from the lever assembly in accordance with the fourth embodiment of the present invention.
Figure 34:
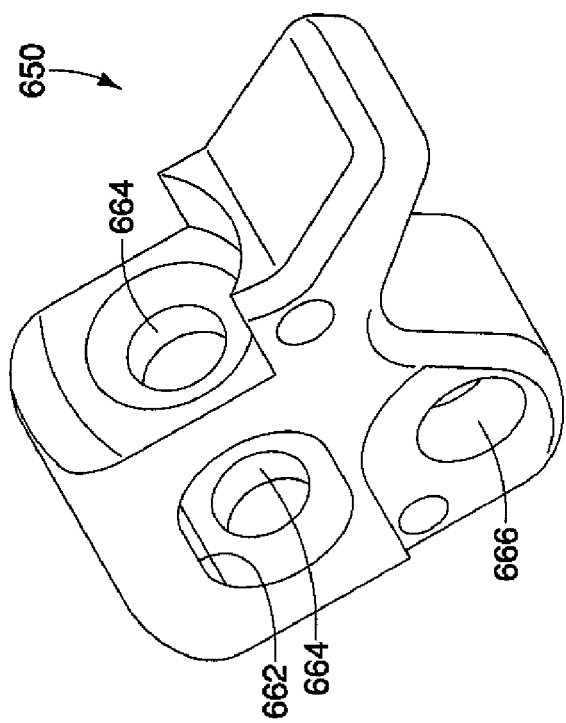
FIG. 34 is a perspective view of a portion of the reach adjustment mechanism showing a block member removed from the lever assembly in accordance with the fourth embodiment of the present invention.

As shown in FIGS. 21-23 and 25-29, the recess 566 is defined between the lever support portions 568. As best shown in FIG. 22, each of the lever support portions 568 includes a pivot pin aperture 574 and an irregularly shaped opening 576. The two pivot pin apertures 574 are aligned with one another, as indicated in FIG. 28. The openings 576 are likewise aligned with one another as indicated in FIG. 29. The irregularly shaped openings 576 partially guide the movement of the lever assembly 548 and the reach adjustment mechanism 550, as described below. However, as will be better understood below, only a portion of the surfaces of the irregularly shaped openings 576 are used to guide the movement of the lever assembly 548 and the reach adjustment mechanism 550. The irregularly shaped opening 576 are oversized, for instance, to allow for assembly of the hydraulic brake actuation device 530.

The upper side plate 570 bolts to the lever support portion 568 at an upper side of the hydraulic master cylinder housing 534 as indicated in FIG. 22. However, the upper side plate 570 also includes a projection (not shown) that inserts into a portion of the irregularly shaped opening 576 of the lever support portion 568 at the upper side of the hydraulic master cylinder housing 534, thereby reducing the overall size of the irregularly shaped opening 576.

Figure 24:
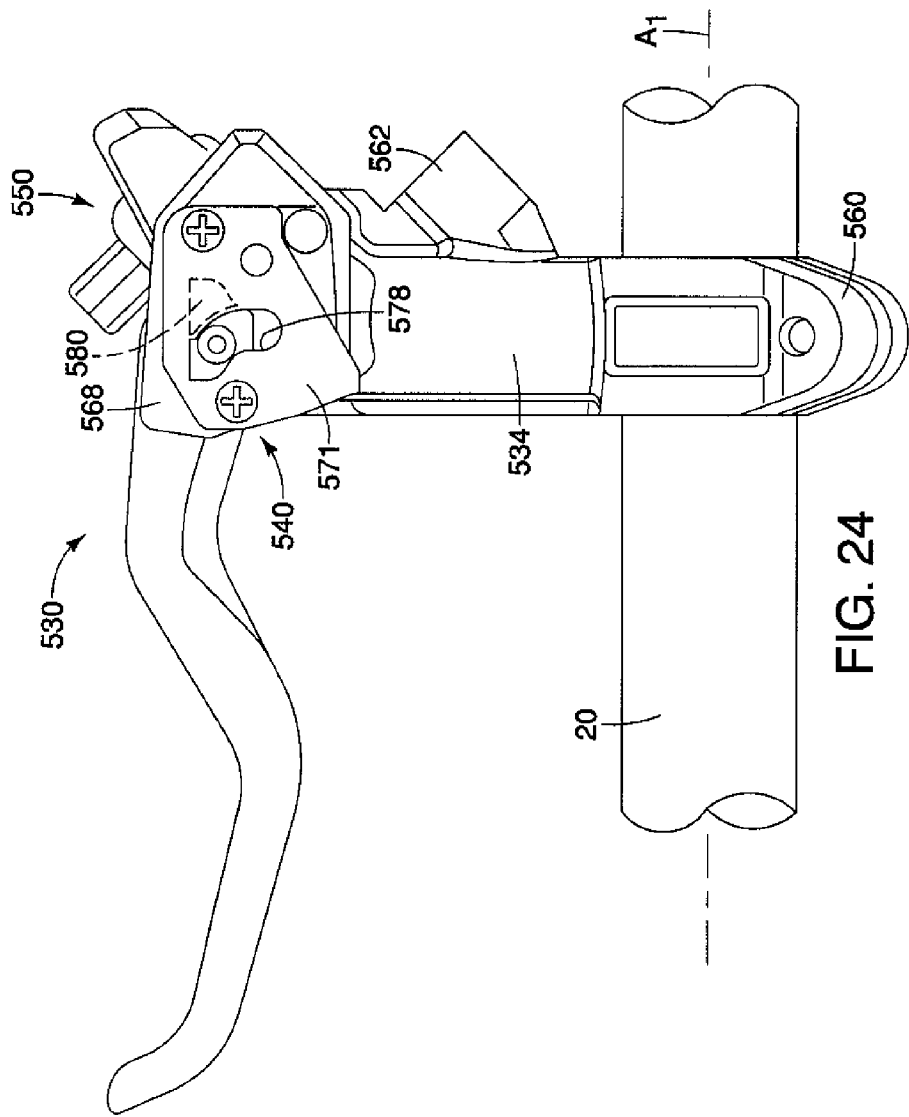
FIG. 24 is a bottom view of the hydraulic brake actuation device in accordance with the fourth embodiment of the present invention.
Figure 23:
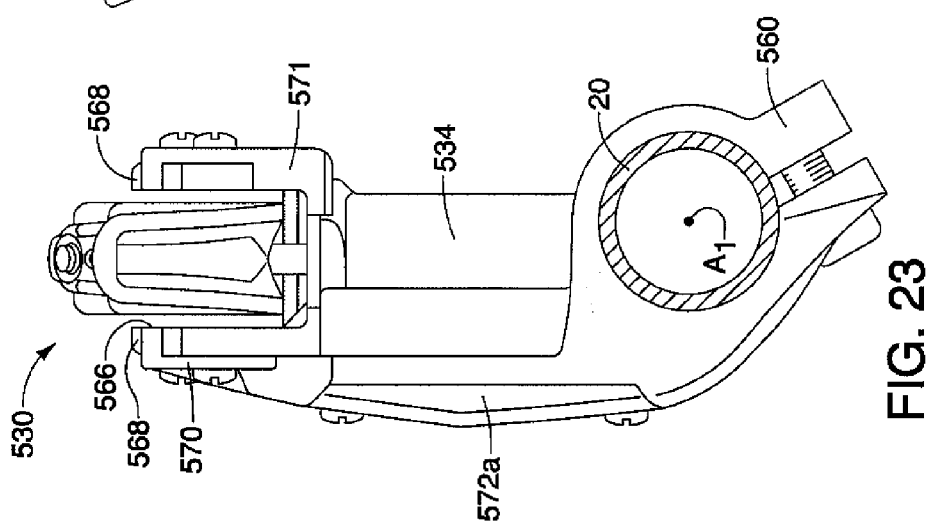
FIG. 23 is a first side view of the hydraulic brake actuation device in accordance with the fourth embodiment of the present invention.

Similarly, the lower side plate 571 bolts to the lever support portion 568 at an underside of the hydraulic master cylinder housing 534 as indicated in FIG. 22. The lower side plate 571 includes a guide opening 578 and a projection 580 that inserts into a portion of the irregularly shaped openings 576 of the lever support portion 568 at the underside of the hydraulic master cylinder housing 534 thereby reducing the overall size of the irregularly shaped opening 576. Although not shown, the projection on the upper side plate 570 is a mirror image of the projection 580 and serves the same purpose as the projection 580. Specifically, the projection 580 reduces the size of the irregularly shaped opening 576 to conform to the shape of the guide opening 578, as best shown in FIG. 24.

The brake reservoir 572 is in fluid communication with the cylinder bore 564 for supplying brake fluid in a conventional manner. The brake reservoir 572 includes a cover 572a, as shown in FIG. 22.

With reference now to FIGS. 22 and 26, a description of the master piston 536 is now provided. The master piston 536 is a cylindrically shaped member that basically includes a pair of seal receiving recesses 582 and 584 and a push rod receiving end 590. The push rod receiving end 590 includes a concaved recess shown best in FIG. 26.

With reference now to FIGS. 22, 26 and 27 a description of the push rod 544 is now provided. The push rod 544 is an elongated member having a piston contacting portion 596, a connecting end 598 and a rod plate 600. The piston contacting portion 596 (a master piston coupling end) has a semi-spherical shape corresponding to the shape of the push rod receiving end 590 of the master piston 536. As indicated in FIGS. 26 and 27, the piston contacting portion 596 directly contacts the push rod receiving end 590 of the master piston 536. The connecting end 598 (a cam coupling end) has cylindrical shape that has a diameter smaller than that of the piston contacting portion 596. The connecting end 598 moves along a non-linear path relative to movement of the master piston 536 as is shown by comparing FIGS. 42 and 43. Thus, the spherical shape of the piston contacting portion 596 of the push rod 544 allows the push rod 544 to swivel and pivot slightly relative to the push rod receiving end 590 of the master piston 536.

The rod plate 600 is a U-shaped member as best shown in FIG. 38. As shown in FIG. 38, the rod plate 600 includes a base portion 602 and two generally parallel side walls 604 that extend away from the base portion 602. The base portion 602 has a central aperture 606 dimensioned to receive the connecting end 598 of the push rod 544, as indicated in FIGS. 26 and 27. As shown in FIGS. 22 and 28, the side walls 604 each have a bore 608. The bores 608 are axially aligned with one another.

The push rod 544 is operatively coupled to the master piston 536 for reciprocative movement of the master piston 536 in the hydraulic master cylinder housing 534 between the neutral position (FIG. 42) and the braking position (FIG. 43).

As is best shown in FIGS. 22 and 29, the rod plate 600 of the push rod 544 also includes a shaft 610, a pair of rollers 612, a cam roller 614, a cam roller washer 616 and end caps 618. The shaft 610 is inserted through the irregularly shaped openings 576 and the bores 608 of the side walls 604 of the rod plate 600 with the cam roller 614 and a cam roller bearing 616 disposed between the side walls 604, as indicated in FIG. 29. The rollers 612 are rotatably installed on opposite ends of the shaft 610.

With specific reference to FIGS. 22 and 27 a description of the lever assembly 548 is now provided. The lever assembly 548 basically includes a lever member 620, a lever pivot pin 622 and the reach adjustment mechanism 550. The lever member 620 is an elongated member that is pivotally attached to the hydraulic master cylinder housing 534 for pivotal movement between the neutral position (at rest position) and the braking position (brake actuation position).

As best shown in FIGS. 30-33, the lever member 620 basically includes a grip end 630, an elongated bore 632, a pair of side walls 634 that at least partially define the elongated bore 632, a pair of pivot pin apertures 636 extending through the side walls 634, a pair of first elongated slots 638 and a pair of cam slots 640. The pivot pin apertures 636 are axially aligned with one another and define a pivot axis $A_3$. The first elongated slots 638 are also axially aligned with one another. Further, the cam slots 640 are aligned with one another.

The pivot pin 622 extends through the pivot pin apertures 636 and further through the pivot pin apertures 574 in the lever support portions 568 of the hydraulic master cylinder housing 534. Consequently, the lever member 620 (the lever) is pivotal with respect to the hydraulic master cylinder housing 534 (the housing) about the pivot axis $A_3$. As is best shown in FIGS. 27 and 33 the elongated bore 632 of the lever member 620 extends in a direction approximately perpendicular to the pivot axis $A_3$.

With specific reference to FIGS. 22, 27 and 34-38, a description of the reach adjustment mechanism 550 is now provided. The reach adjustment mechanism 550 includes a block member 650, a elongated pin 652, a bolt 654, a nut 656 and the first elongated slots 638 in the lever member 620.

The reach adjustment mechanism 550 is coupled to the lever member 620 for movement therewith to operatively engage the push rod 544 and adjust the neutral position (the at rest position) of the lever member 620 relative to the hydraulic master cylinder housing 534 (the housing) and the handle bar 20.

With specific reference to FIGS. 34-37 and 39, a description of the block member 650 is now provided. The block member 650 (a earn member) preferably made of a rigid hard material, such as a metal material, that includes a cam surface 660, a second elongated slot 662, an adjuster bolt bore 664 and a pivot pin bore 666. The cam surface 660 is shaped for contact with the cam roller 614, as described below. The second elongated slot 662 is dimensioned such that the elongated pin 652 is freely insertable therein. The adjuster bolt bore 664 is oriented perpendicular to the second elongated slot 662 and is open to the second elongated slot 662, thus making the block member 650 partially hollow. The adjuster bolt bore 664 is dimensioned to receive the bolt 654. The pivot pin bore 666 extends in a direction generally parallel to the second elongated slot 662 and is dimensioned to receive the lever pivot pin 622.

The block member 650 is installed within the elongated bore 632 of the lever member 620, as indicated in FIG. 27. As shown fully assembled in FIGS. 28 and 39, the pivot pin 622 extends through the pivot pin bore 666, through the pivot pin apertures 636 of the lever member 620 and through the pivot pin apertures 574 in the lever support portions 568 of the hydraulic master cylinder housing 534. Hence, the block member 650 pivots with the lever member 620 relative to the hydraulic master cylinder housing 534. However, the angular orientation of block member 650 relative to the lever member 620 can be adjusted, as described below.

Figure 39:
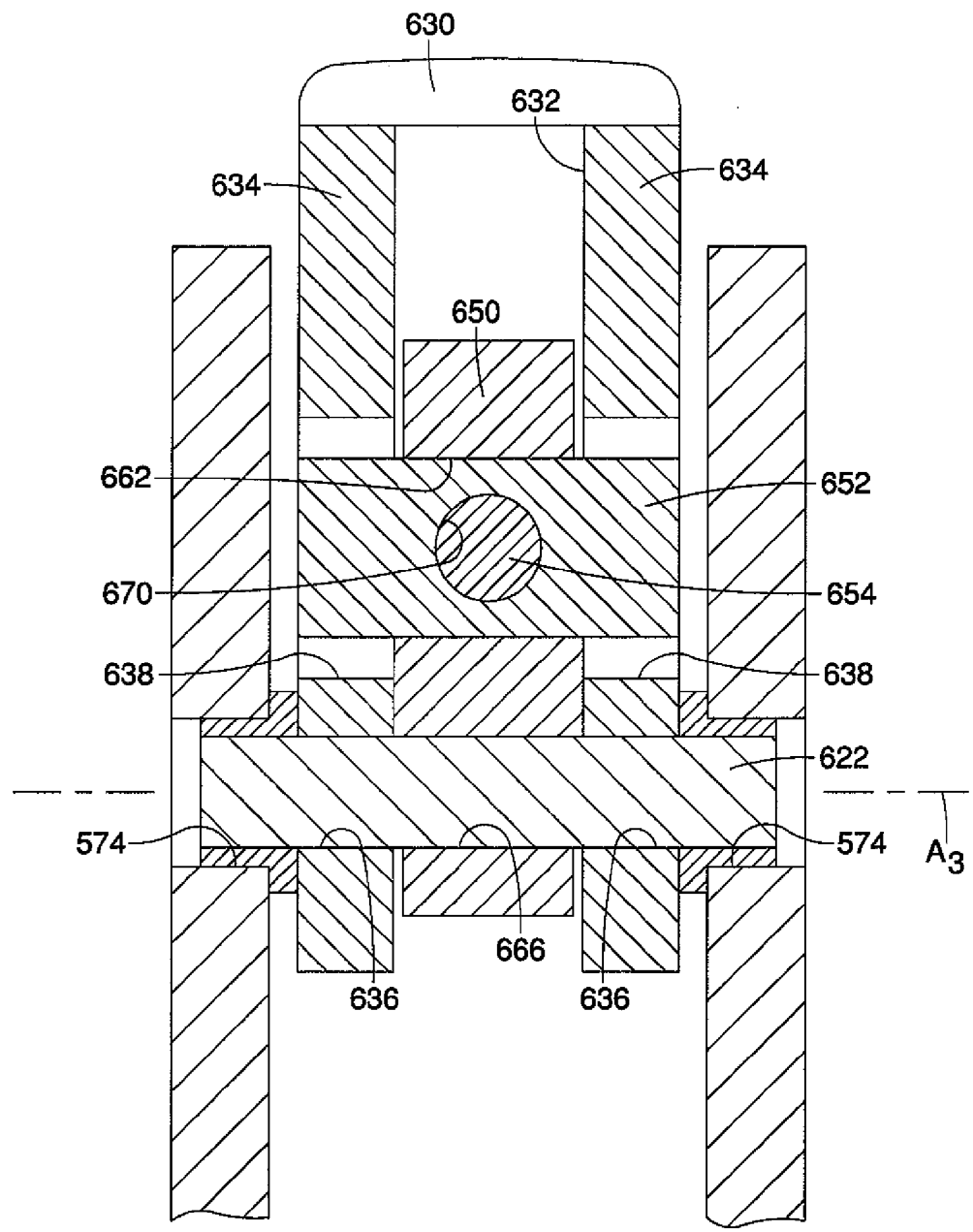
FIG. 39 is another cross-sectional view of the hydraulic brake actuation device taken along the line 39-39 in FIG. 27 showing a pivot pin about which the lever and the reach adjustment mechanism pivot and the block member of the reach adjustment mechanism in accordance with the fourth embodiment of the present invention.

As shown in FIGS. 22, 27 and 39, the elongated pin 652 includes a threaded central aperture 670 that extends in a direction perpendicular to the overall length of the bolt 654. As indicated in FIGS. 27 and 39, the elongated pin 652 is installed into the second elongated slot 662 of the block member 650. As is further shown in FIG. 39, the elongated pin 562 further extends through the first elongated slots 638 in the lever member 620. The bolt 654 (a positioning adjusting bolt) is installed in the adjuster bolt bore 664 of the block member 650 and further threads into the threaded central aperture 670 of the elongated pin 652. As shown in FIG. 27, the nut 656 is non-rotatable fixed to the end of the bolt 654 such that the nut 656 and the bolt 654 rotate with one another as a single member.

Figure 41:
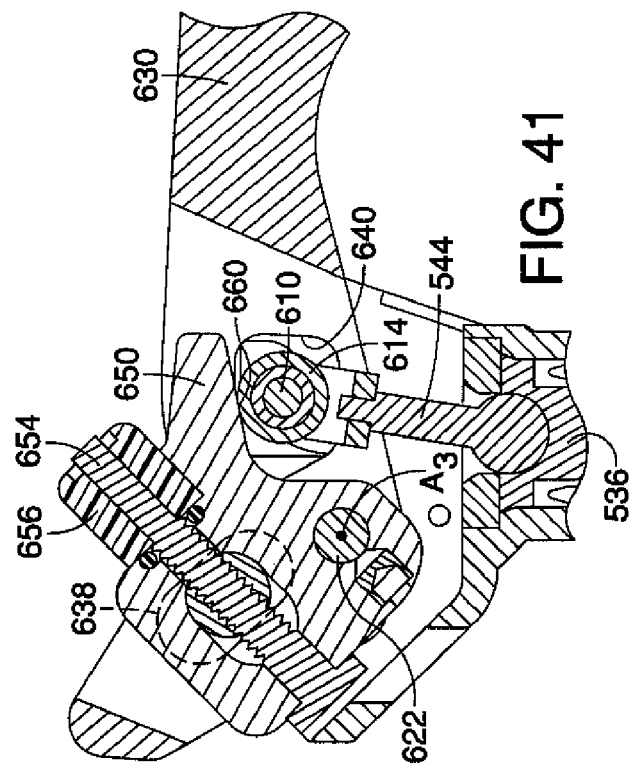
FIG. 41 is a cross-sectional view similar to FIG. 40 of the hydraulic brake actuation device showing the reach adjustment mechanism adjusted to a second lever adjustment orientation in accordance with the fourth embodiment of the present invention.

When the nut 656 and bolt 654 are rotated, the threads of the bolt 654 causes a change in the relative position of the elongated pin 652 relative to the length of the bolt 654. Further, this change in position causes a change in angular orientation of the block member 650 relative to the lever member 620. For instance, in FIG. 40, the bolt 654 and the elongated pin 652 of the reach adjustment mechanism 550 are oriented such that the lever member 620 is at its farthest distance from the handlebar 20 with the lever member 620 in the neutral or at rest position. In FIG. 41 the bolt 654 and the elongated pin 652 of the reach adjustment mechanism 550 are oriented such that the lever member 620 is distanced much closer to the handlebar 20 with the lever member 620 in the neutral or at rest position.

Figure 40:
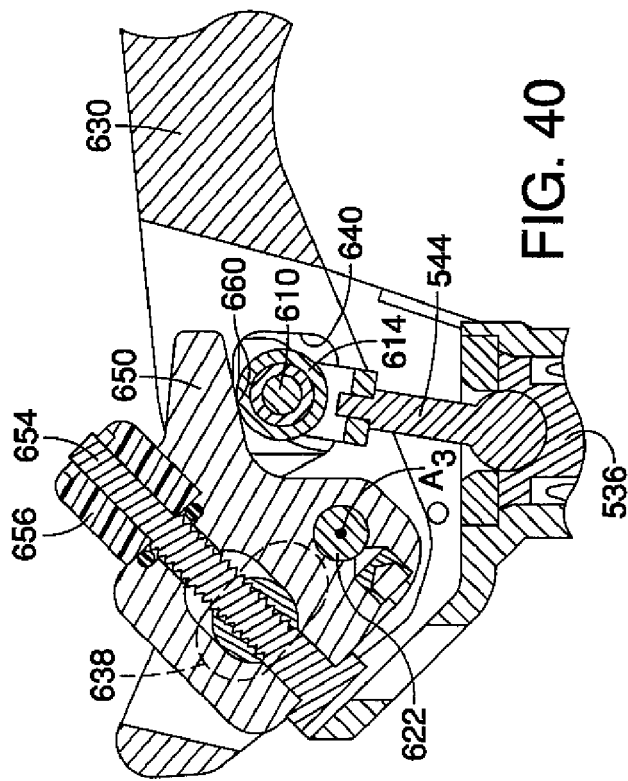
FIG. 40 is a cross-sectional view similar to FIG. 27 of the hydraulic brake actuation device showing the reach adjustment mechanism adjusted to a first lever adjustment orientation in accordance with the fourth embodiment of the present invention.

As is indicated in FIGS. 40 and 41, the reach adjustment mechanism 550 includes the elongated pin 652 and the block member 650 (the cam member) and is configured such that the second elongated slot 662 and the first elongated slots 638 are approximately perpendicular to one another with the lever in the at rest position (FIG. 42). Further, the elongated pin 652 extends through both the first and second elongated slots 638 and 662 coupling the block member 650 (the cam member) to the lever member 620 for movement therewith.

Consequently, the lever member 620 can be adjusted a comfortable distance away from the handlebar 20. The configuration and shape of the block member 650, the cam surface 660 of the block member 650, the second elongated slot 662 of the block member 650, the first elongated slots 638 of the lever member 620 and the push rod 544 are configured to provide a smooth and consistent motion of the lever member 620 relative to the movement of the master piston 536.

More specifically, when the lever member 620 is moved from the neutral or at rest position depicted in FIG. 42, the pin 652 causes the block member 650 to move with the lever member 620. The cam surface 660 of the block member 650 contacts the cam roller 614 thereby causing movement of the push rod 544 and the master piston 536. However, the cam roller 614 is rotatably supported on the shaft 610 which also rotatably supports the rollers 612. Movement of the cam roller 614 is therefore also guided by the interaction between the rollers 612 and the surfaces of the irregularly shaped opening 576 and the projection 580. As mentioned above, the projection 580 reduces the size of the irregularly shaped opening 576 to conform to the shape of the guide opening 578, as shown in FIG. 24. Therefore, the movement path followed by the cam roller 614, the shaft 610 and the rollers 612 conforms to the shape of the guide opening shown in FIG. 24.

In the hydraulic brake actuation device 530, a first lever ratio is defined as a linear movement distance of the master piston 536 relative to an angular movement distance of the lever member 620 with the lever member 620 proximate the neutral position and the master piston 536 proximate the neutral position (FIG. 42). A second lever ratio is defined as a linear movement distance of the master piston 536 relative to an angular movement distance of the lever member 620 with the lever proximate the brake actuation position and the master piston 536 proximate the braking position (FIG. 43). The reach adjustment mechanism 550 is arranged such that the first lever ratio remains constant regardless of adjustments to the neutral position (the at rest position) of the lever member 630. In other words, the reach adjustment mechanism 550 can be manipulated to put the lever member 630 in any of the depicted adjustment positions (for example, the three positions shown in FIGS. 27, 40 and 41). In any of these positions, the first lever ratio remains the same. Further, regardless of the adjustment position of the lever member 630 achieved by manipulation of the reach adjustment mechanism 550, the second lever ratio is also the same. Further, the first lever ratio is approximately the same as the second lever ratio in the fourth embodiment of the present invention.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:
1. A bicycle hydraulic brake actuation device comprising:
a hydraulic master cylinder housing having a bore;
a master piston movably mounted in the bore;
a push rod operatively coupled to the master piston for reciprocative movement of the master piston in the hydraulic master cylinder between a neutral position and a braking position;
a lever pivotally attached to the housing for pivotal movement between an at rest position and a brake actuation position, the lever including at least one first elongated slot; and
a reach adjustment mechanism having an elongated pin and a cam member with at least one second elongated slot, the first and second elongated slots being approximately perpendicular to one another with the lever in the at rest position, the elongated pin extending through both the first and second elongated slots coupling the cam member to the lever for movement therewith, the reach adjustment mechanism being coupled to the lever for movement therewith to operatively engage the push rod and adjust the at rest position of the lever relative to the housing, the reach adjustment mechanism being arranged such that a first lever ratio remains constant regardless of adjustments to the at rest position of the lever, the first lever ratio being defined as a linear movement distance of the master piston relative to an angular movement distance of the lever with the lever proximate at the rest position and the piston proximate the neutral position.

2. The bicycle hydraulic brake actuation device as set forth in claim 1, wherein
the push rod includes a roller configured to contact a contact surface of the reach adjustment mechanism.

3. The bicycle hydraulic brake actuation device as set forth in claim 1, wherein
the push rod includes a plurality of rollers, at least one of the rollers configured to contact a contact surface of the reach adjustment mechanism.

4. The bicycle hydraulic brake actuation device as set forth in claim 1 wherein
the push rod includes a master piston coupling end and a cam coupling end, the cam coupling end being configured to move along a non-linear path relative to movement of the master piston.

5. The bicycle hydraulic brake actuation device as set forth in claim 1, wherein
the push rod is configured to move along a linear path approximately coaxial to movement of the master piston.

6. The bicycle hydraulic brake actuation device as set forth in claim 1, wherein
the lever is pivotal with respect to the housing about a pivot axis, the lever includes an elongated, bore that extends in a direction approximately perpendicular to the pivot axis, and the reach adjustment mechanism is at least partially disposed within the elongated bore.

7. The bicycle hydraulic brake actuation device as set forth in claim 1, wherein
the hydraulic master cylinder housing includes a handlebar attachment portion configured to install to a portion of a bicycle handlebar, and
the master piston is configured to move between the neutral position and the braking position along a movement axis that extends approximately perpendicular to the portion of the bicycle handlebar.

8. The bicycle hydraulic brake actuation device as set forth in claim 1, wherein
the hydraulic master cylinder housing includes a handlebar attachment portion configured to install to a portion of a bicycle handlebar, and
the master piston is configured to move between the neutral position and the braking position along a movement axis that extends approximately parallel to the portion of the bicycle handlebar.

9. The bicycle hydraulic brake actuation device as set forth in claim 1, wherein
a second lever ratio is defined as a linear movement distance of the master piston relative to an angular movement distance of the lever with the lever proximate the brake actuation position and the master piston proximate the braking position, the first lever ratio being approximately the same as the second lever ratio.

10. The bicycle hydraulic brake actuation device as set forth in claim 1, wherein
a second lever ratio is defined as a linear movement distance of the master piston relative to an angular movement distance of the lever with the lever proximate the brake actuation position and the master piston proximate the braking position, the first lever ratio being different from the second lever ratio.

11. A bicycle hydraulic brake actuation device comprising:
a hydraulic master cylinder housing having a bore;
a master piston movably mounted in the bore;
a push rod operatively coupled to the master piston for reciprocative movement of the master piston in the hydraulic master cylinder between a neutral position and a braking position;
a lever pivotally attached to the housing for pivotal movement between an at rest position and a brake actuation position; and
a reach adjustment mechanism coupled to the lever for movement therewith to operatively engage the push rod and adjust the at rest position of the lever relative to the housing, the reach adjustment mechanism being arranged such that:
a first lever ratio remains constant regardless of adjustments to the at rest position of the lever, the first lever ratio being defined as a linear movement distance of the master piston relative to an angular movement distance of the lever with the lever proximate at the rest position and the piston proximate the neutral position, and
a second lever ratio is defined as a linear movement distance of the master piston relative to an angular movement distance of the lever with the lever proximate the brake actuation position and the master piston proximate the braking position, the first lever ratio being different from the second lever ratio.

12. The bicycle hydraulic brake actuation device as set forth in claim 11, wherein
the push rod includes a roller configured to contact a contact surface of the reach adjustment mechanism.

13. The bicycle hydraulic brake actuation device as set forth in claim 11, wherein
the push rod includes a plurality of rollers, at least one of the rollers configured to contact a contact surface of the reach adjustment mechanism.

14. The bicycle hydraulic brake actuation device as set forth in claim 11, wherein
the push rod is configured to move along a linear path approximately coaxial to movement of the master piston.

15. The bicycle hydraulic brake actuation device as set forth in claim 11, wherein
the lever is pivotal with respect to the housing about a pivot axis, the lever includes an elongated bore that extends in a direction approximately perpendicular to the pivot axis, and the reach adjustment mechanism is at least partially disposed within the elongated bore.

16. The bicycle hydraulic brake actuation device as set forth in claim 11, wherein
the hydraulic master cylinder housing includes a handlebar attachment portion configured to install to a portion of a bicycle handlebar, and
the master piston is configured to move between the neutral position and the braking position along a movement axis that extends approximately perpendicular to the portion of the bicycle handlebar.

17. The bicycle hydraulic brake actuation device as set forth in claim 11, wherein
the hydraulic master cylinder housing includes a handlebar attachment portion configured to install to a portion of a bicycle handlebar, and
the master piston is configured to move between the neutral position and the braking position along a movement axis that extends approximately parallel to the portion of the bicycle handlebar.

* * * * *